(12) United States Patent
Tomoshige et al.

(10) Patent No.: US 12,288,849 B2
(45) Date of Patent: Apr. 29, 2025

(54) SOLID-STATE BATTERY

(71) Applicant: Murata Manufacturing Co., Ltd., Nagaokakyo (JP)

(72) Inventors: Yosuke Tomoshige, Nagaokakyo (JP); Mitsuyoshi Nishide, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 519 days.

(21) Appl. No.: 17/834,192

(22) Filed: Jun. 7, 2022

(65) Prior Publication Data
US 2022/0302507 A1 Sep. 22, 2022

Related U.S. Application Data

(63) Continuation of application No. PCT/JP2020/046114, filed on Dec. 10, 2020.

(30) Foreign Application Priority Data

Dec. 11, 2019 (JP) .................. 2019-223855

(51) Int. Cl.
*H01M 10/0562* (2010.01)
*H01M 10/0585* (2010.01)
(Continued)

(52) U.S. Cl.
CPC ... *H01M 10/0585* (2013.01); *H01M 10/0562* (2013.01); *H01M 50/103* (2021.01);
(Continued)

(58) Field of Classification Search
CPC .......... H01M 10/0562; H01M 50/547; H01M 50/55; H01M 10/052; H01M 10/0585
See application file for complete search history.

(56) References Cited

U.S. PATENT DOCUMENTS

| | | |
|---|---|---|
| 2010/0075219 A1 | 3/2010 | Iwaya et al. |
| 2020/0014071 A1 | 1/2020 | Nakashima et al. |
| 2020/0020974 A1 | 1/2020 | Shimizu et al. |

FOREIGN PATENT DOCUMENTS

| | | |
|---|---|---|
| JP | 2002270241 A | 9/2002 |
| JP | 2008053125 A | 3/2008 |

(Continued)

OTHER PUBLICATIONS

International Search Report in PCT/JP2020/046114, mailed Jan. 19, 2021, 3 pages.

*Primary Examiner* — Kevin E Yoon
(74) *Attorney, Agent, or Firm* — ArentFox Schiff LLP

(57) ABSTRACT

A solid-state battery including a solid-state battery laminate having a positive electrode layer, a negative electrode layer, and a solid electrolyte layer interposed between the positive electrode layer and the negative electrode layer, each of the positive electrode layer and the negative electrode layer having an electrode active material. A first active material contour portion in which the electrode active material in one of the positive electrode layer and the negative electrode layer extends to a first plan-view contour of the solid-state battery laminate, and a first non-active material contour portion in which the electrode active material in the other of the positive electrode layer and the negative electrode layer does not extend to the first plan-view contour of the solid-state battery laminate face each other in a lamination direction.

14 Claims, 18 Drawing Sheets

(51) Int. Cl.
*H01M 50/103* (2021.01)
*H01M 50/547* (2021.01)
*H01M 50/553* (2021.01)

(52) U.S. Cl.
CPC ....... *H01M 50/547* (2021.01); *H01M 50/553* (2021.01); *H01M 2220/30* (2013.01)

(56) References Cited

FOREIGN PATENT DOCUMENTS

| | | | |
|---|---|---|---|
| JP | 2009181905 A | | 8/2009 |
| JP | 2011198692 A | * | 10/2011 |
| JP | 2017183052 A | | 10/2017 |
| WO | 2008099508 A1 | | 8/2008 |
| WO | 2018186442 A1 | | 10/2018 |
| WO | 2018203474 A1 | | 11/2018 |

* cited by examiner

SOLID-STATE BATTERY

CROSS REFERENCE TO RELATED APPLICATIONS

The present application is a continuation of International application No. PCT/JP2020/046114, filed Dec. 10, 2020, which claims priority to Japanese Patent Application No. 2019-223855, filed Dec. 11, 2019, the entire contents of each of which are incorporated herein by reference.

FIELD OF THE INVENTION

The present invention relates to a solid-state battery. More specifically, the present invention relates to a layered solid-state battery constructed by stacking respective layers constituting battery constituent units.

BACKGROUND OF THE INVENTION

Hitherto, secondary batteries that can be repeatedly charged and discharged have been used for various purposes. For example, secondary batteries are used as power sources of electronic devices such as smartphones and notebooks.

In secondary batteries, a liquid electrolyte is generally used as a medium for ion transfer contributing to charging and discharging. That is, a so-called electrolytic solution is used for secondary batteries. However, such secondary batteries are generally required to have safety in terms of leakage prevention of an electrolytic solution. Since an organic solvent or the like used in an electrolytic solution is a combustible substance, safety is required also in that respect.

Therefore, solid-state batteries using a solid electrolyte instead of an electrolytic solution have been studied.

Patent Document 1: Japanese Patent Application Laid-Open No. 2009-181905
Patent Document 2: Japanese Patent Application Laid-Open No. 2017-183052
Patent Document 3: Japanese Patent Application Laid-Open No. 2011-198692
Patent Document 4: WO 2008/099508 A

SUMMARY OF THE INVENTION

A solid-state battery includes a solid-state battery laminate including a positive electrode layer, a negative electrode layer, and a solid electrolyte layer between the positive electrode layer and the negative electrode layer (see Patent Documents 1 to 4 above). More specifically, the positive electrode layer and the negative electrode layer are laminated with the solid electrolyte layer interposed therebetween. While a positive electrode active material is contained in the positive electrode layer, a negative electrode active material is contained in the negative electrode layer, and these materials are involved in accepting and donating electrons in the solid-state battery. That is, ions move between the positive electrode layer and the negative electrode layer through the solid electrolyte to charge and discharge the solid-state battery. In such a solid-state battery, external terminals 400 such as a positive electrode terminal and a negative electrode terminal face each other with the laminate interposed therebetween (see FIG. 18).

The inventors of the present application have noticed that there is still a problem to be overcome in view of actual use of the solid-state battery and have found a need to take measures therefor. Specifically, the inventors of the present application have found that there are the following problems.

In view of various applications of the solid-state battery, it is conceivable that the solid-state battery is housed in a battery housing space such as a casing or is mounted on various substrates such as a printed wiring board or a motherboard. That is, assuming various battery applications, arrangement required for the external terminals of the solid-state battery is not necessarily constant, and may be appropriately changed depending on the battery applications. Therefore, it cannot be said that the degree of freedom in arrangement of external terminals of positive and negative electrodes of the solid-state battery in the conventional case is large, and it is desirable that the external terminals can be provided according to various battery applications.

The present invention has been made in view of such problems. That is, a main object of the present invention is to provide a solid-state battery having a higher degree of freedom in terms of arrangement of external terminals.

The inventors of the present application have made an attempt to solve the above problems not by follow-on approach to the prior art but new direction approach. As a result, the inventors have reached the invention of a solid-state battery in which the above main object has been achieved.

In the present invention, there is provided a solid-state battery, including: a solid-state battery laminate including a positive electrode layer, a negative electrode layer, and a solid electrolyte layer interposed between the positive electrode layer and the negative electrode layer, each of the positive electrode layer and the negative electrode layer having an electrode active material, and in which a first active material contour portion in which the electrode active material in one of the positive electrode layer and the negative electrode layer extends to a first plan-view contour of the solid-state battery laminate and a first non-active material contour portion in which the electrode active material in the other of the positive electrode layer and the negative electrode layer does not extend to the first plan-view contour face each other in a lamination direction.

The solid-state battery according to the present invention is a solid-state battery having a higher degree of freedom in terms of arrangement of external terminals.

In the solid-state battery according to the present invention, the active material contour portion of one of the electrodes and the non-active material contour portion of the other of the electrodes face each other in the lamination direction. In the present invention, as long as this facing relation is maintained, the external terminal of one of the electrodes can be provided to be in contact with the active material contour portion of the one of the electrodes and can be relatively freely arranged. Similarly, the external terminal of the other of the electrodes can also be provided to be in contact with the active material contour portion of the other of the electrodes (that is, preferably, a portion corresponding to the contour portion excluding the above-described non-active material contour portion) and can be relatively freely arranged. As described above, the solid-state battery of the present invention is relatively less restricted in terms of arrangement of the external terminals of the positive electrode and the negative electrode.

DETAILED DESCRIPTION OF THE INVENTION

Figure 1A:
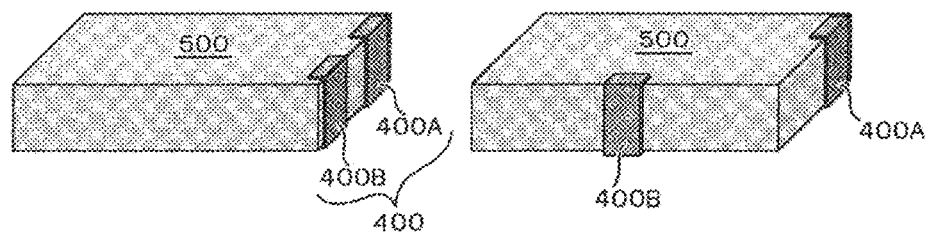
FIGS. 1(a) to 1(f) are schematic perspective views for describing "a degree of freedom in installation of external terminals" in the present invention.
Figure 1B:
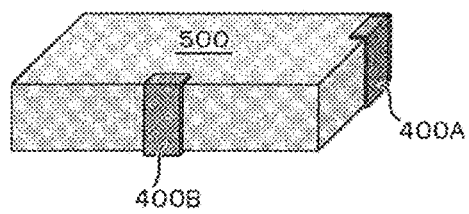
Figure 1C:
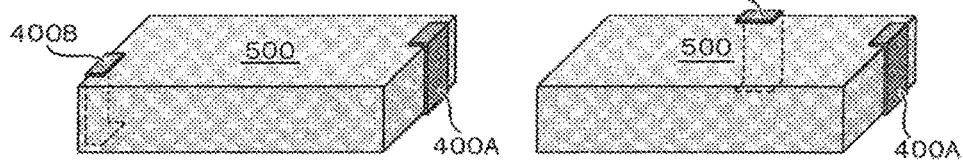
Figure 1D:
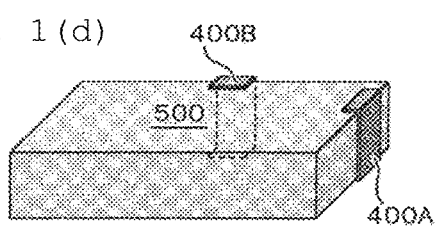
Figure 1E:
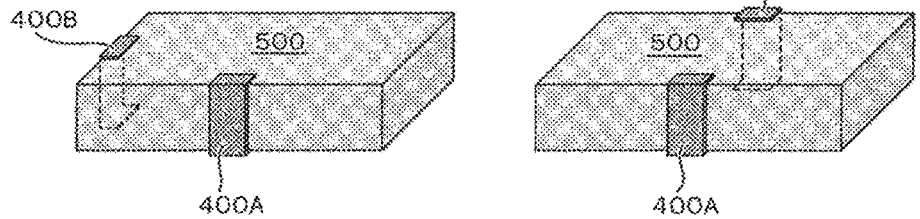
Figure 1F:
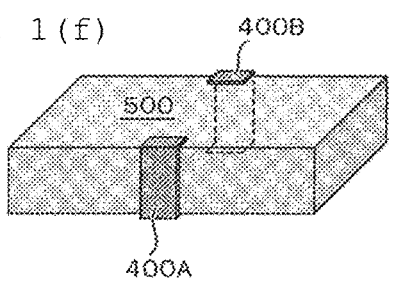

Hereinafter, a solid-state battery of the present invention will be described in detail. Although the description will be given with reference to the drawings as necessary, the illustrated contents are only schematically and exemplarily illustrated to facilitate understanding of the present invention, and appearance and/or dimensional ratio, and the like may be different from actual ones.

The term "plan view" described herein is based on a form in a case where an object is captured from the upper side or the lower side along a thickness direction corresponding to a lamination direction of respective layers constituting a solid-state battery (particularly, a solid-state battery laminate). The term "sectional view" described herein is based on a form in which the object is captured from a direction substantially perpendicular to the lamination direction of respective layers constituting the solid-state battery (particularly, the solid-state battery laminate). In short, the term "sectional view" is based on a form obtained in a case where the object is captured by being cut with a plane parallel to the thickness direction. The terms "vertical direction" and "horizontal direction" directly or indirectly used herein correspond to the vertical direction and the horizontal direction in the drawings, respectively. Unless otherwise specified, the same reference numerals or symbols denote the same members or parts or the same semantic contents. In a preferred embodiment, it can be understood that the downward direction in the vertical direction (that is, a direction in which gravity acts) corresponds to the "downward direction"/"bottom surface side", and the opposite direction corresponds to the "upward direction"/"top surface side".

The term "solid-state battery" described in the present invention refers to a battery whose constituent elements are configured from a solid in a broad sense, and refers to an all-solid-state battery whose constituent elements (particularly preferably all constituent elements) are configured from a solid in a narrow sense. In a preferred embodiment, the solid-state battery in the present invention is a layered solid-state battery configured such that respective layers constituting battery constituent units are laminated with each other, and such respective layers are preferably made of a sintered body. The "solid-state battery" includes not only a so-called "secondary battery" capable of repeatedly being charged and discharged, but also a "primary battery" capable of only being discharged. According to a preferred embodiment of the present invention, the "solid-state battery" is a secondary battery. The "secondary battery" is not excessively limited by its name, and may include, for example, an electrochemical device such as a power storage device.

Hereinafter, first, a basic configuration of a solid-state battery that is considered to be necessary for understanding the present invention will be described. The configuration of the solid-state battery described herein is merely an example for describing a matter that is a premise of the solid-state battery, and does not limit the invention.

[Basic Configuration of Solid-State Battery]

Figure 18:
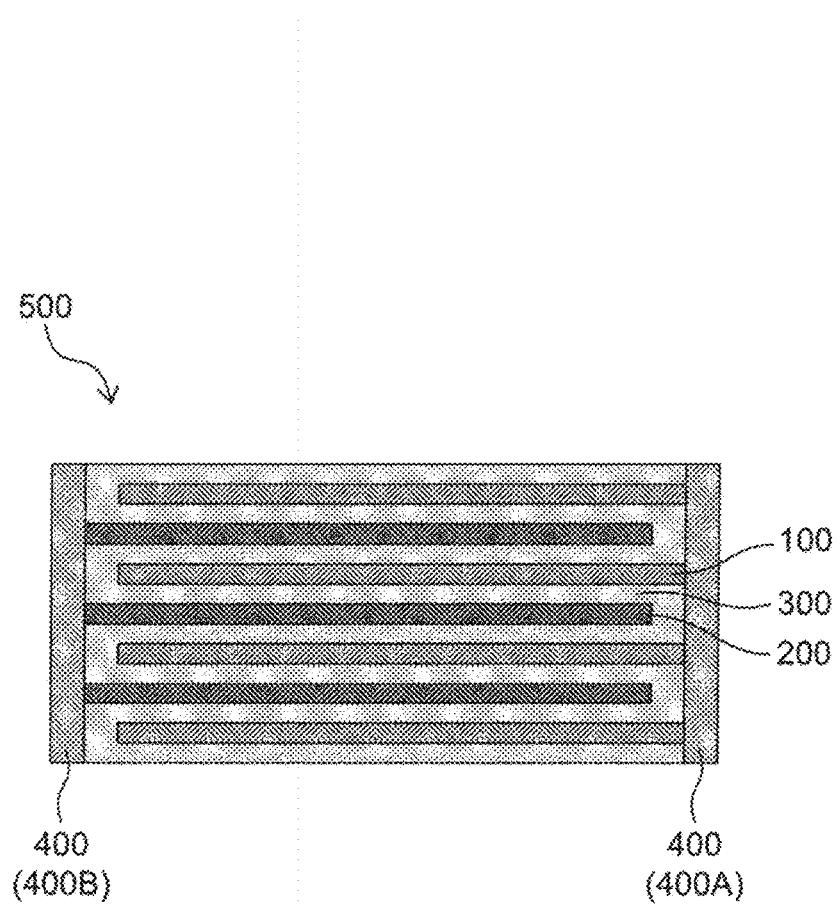
FIG. 18 is a schematic sectional view for describing a basic configuration of the solid-state battery.

The solid-state battery includes at least electrode layers of a positive electrode and a negative electrode and a solid electrolyte layer. Specifically, as illustrated in FIG. 18, a solid-state battery has a solid-state battery laminate 500 which includes battery constituent units including a positive electrode layer 100, a negative electrode layer 200, and a solid electrolyte layer 300 interposed at least between the positive electrode layer and the negative electrode layer.

The solid-state battery is preferably formed by firing respective layers constituting the solid-state battery. The positive electrode layer, the negative electrode layer, the solid electrolyte layer, and the like form sintered layers. Preferably, the positive electrode layer, the negative electrode layer, and the solid electrolyte layer are fired integrally with each other, and thus, the solid-state battery laminate forms an integrally sintered body.

The positive electrode layer 100 is an electrode layer containing at least a positive electrode active material. The positive electrode layer may further contain a solid electrolyte. In a preferred embodiment, the positive electrode layer is configured from a sintered body containing at least positive electrode active material grains and solid electrolyte grains. On the other hand, the negative electrode layer is an electrode layer containing at least a negative electrode active material. The negative electrode layer may further contain a solid electrolyte. In a preferred embodiment, the negative electrode layer is configured from a sintered body containing at least negative electrode active material particles and solid electrolyte particles.

The positive electrode active material and the negative electrode active material are materials involved in accepting and donating electrons in the solid-state battery. Ions move (or conduct) between the positive electrode layer and the negative electrode layer through the solid electrolyte layer to accept and donate electrons, whereby charging and discharging are performed. Each of the positive electrode layer and the negative electrode layer is preferably a layer capable of occluding and releasing particularly lithium ions or sodium ions. That is, the solid-state battery is preferably an all-solid-state secondary battery in which lithium ions or sodium ions move between the positive electrode layer and the negative electrode layer through the solid electrolyte layer to charge and discharge the battery.

(Positive Electrode Active Material)

Examples of the positive electrode active material contained in the positive electrode layer include at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$, $LiFePO_4$, and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure, and the like.

(Negative Electrode Active Material)

Examples of the negative electrode active material contained in the negative electrode layer 200 include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, lithium-containing oxide having a spinel-type structure, and the like. Examples of the lithium alloy include Li—Al. Examples of the lithium-containing phosphate compound having a NASICON-type structure include $Li_3V_2(PO_4)_3$ and $LiTi_2(PO_4)_3$. Examples of the lithium-containing phosphate compound having an olivine-type structure include $Li_3Fe_2(PO_4)_3$ and $LiCuPO_4$. Examples of the lithium-containing oxide having a spinel-type structure include $Li_4Ti_5O_{12}$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, a sodium-containing oxide having a spinel-type structure, and the like.

The positive electrode layer and/or the negative electrode layer may contain a conduction aid. Examples of the conduction aid contained in the positive electrode layer and the negative electrode layer may include at least one selected from the group consisting of metal materials such as silver, palladium, gold, platinum, aluminum, copper, and nickel, carbon, and the like. Although not particularly limited, copper is preferred in that copper is difficult to react with a positive electrode active material, a negative electrode active material, a solid electrolyte material, and the like and exhibits an effect of reducing the internal resistance of the solid-state battery.

The positive electrode layer and/or the negative electrode layer may further contain a sintering aid. Examples of the sintering aid may include at least one selected from the group consisting of lithium oxide, sodium oxide, potassium oxide, boron oxide, silicon oxide, bismuth oxide, and phosphorus oxide.

(Solid Electrolyte Layer)

The solid electrolyte layer 300 contains a material capable of conducting lithium ions or sodium ions. In particular, the solid electrolyte layer constituting the battery constituent unit in the solid-state battery is a layer capable of conducting lithium ions between the positive electrode layer and the negative electrode layer. Specific examples of materials for the solid electrolyte layer include a lithium-containing phosphate compound having a NASICON structure, an oxide having a perovskite structure, and an oxide having a garnet-type or pseudo-garnet-type structure. Examples of the lithium-containing phosphate compound having a NASICON structure include $Li_xM_y(PO_4)_3$ ($1 \leq x \leq 2$, $1 \leq y \leq 2$, and M is at least one selected from the group consisting of Ti, Ge, Al, Ga, and Zr). Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or pseudo-garnet-type structure include $Li_7La_3Zr_2O_{12}$.

Examples of materials for the solid electrolyte layer capable of conducting sodium ions include a sodium-containing phosphate compound having a NASICON structure, an oxide having a perovskite structure, and an oxide having a garnet-type or pseudo-garnet-type structure. Examples of the sodium-containing phosphate compound having a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte layer may contain a sintering aid. The sintering aid contained in the solid electrolyte layer may be selected from, for example, the same materials as the sintering aid that may be contained in the positive electrode layer and/or the negative electrode layer.

(Positive Electrode Current Collecting Layer and Negative Electrode Current Collecting Layer)

Although not essential, the positive electrode layer 100 and the negative electrode layer 200 may include a positive electrode current collecting layer and a negative electrode current collecting layer, respectively. Each of the positive electrode current collecting layer and the negative electrode current collecting layer may have a foil form but preferably has a sintered body form (that is, a sintered layer form), focusing on the viewpoint of a reduction in manufacturing cost of the solid-state battery and a reduction in internal resistance of the solid-state battery due to integral firing. When the positive electrode current collecting layer and the negative electrode current collecting layer have a sintered body form, the positive electrode current collecting layer and the negative electrode current collecting layer may be configured by a sintered body containing a conductive material and a sintering aid. The conductive material contained in the positive electrode current collecting layer and the negative electrode current collecting layer may be selected from, for example, the same material as the conduction aid that may be contained in the positive electrode layer and the negative electrode layer. The sintering aid contained in the positive electrode current collecting layer and the negative electrode current collecting layer may be selected from, for example, the same materials as the sintering aid that may be contained in the positive electrode layer and/or the negative electrode layer. In the solid-state battery, the positive electrode current collecting layer and the negative electrode current collecting layer are not essential, and a solid-state battery in which such a positive electrode current collecting layer and/or negative electrode current collecting layer is not provided is also conceivable. That is, the solid-state battery in the present invention may be a solid-state battery without a current collecting layer.

(External Terminal)

The solid-state battery is generally provided with an external terminal. In particular, an external terminal 400 is provided on the side surface of the solid-state battery. FIG. 18 particularly illustrates an arrangement embodiment of a pair of external terminals (400A and 400B) arranged to face each other which is seen in the conventional configuration. More specifically, a positive electrode external terminal 400A connected to the positive electrode layer 100 and a negative electrode external terminal 400B connected to the negative electrode layer 200 are provided (see FIG. 18). Such external terminals preferably contain a material having high conductivity. A specific material for the external terminal is not particularly limited, but examples thereof may include at least one selected from the group consisting of silver, gold, platinum, aluminum, copper, tin, and nickel.

[Features of Solid-State Battery of Present Invention]

The solid-state battery of the present invention has a feature related to arrangement of external terminals. In particular, the present invention has a feature in that the solid-state battery laminate has a configuration that enables arrangement of external terminals different from the conventional arrangement. In the conventional arrangement, the positive electrode external terminal and the negative electrode external terminal of the solid-state battery face each other with the solid-state battery laminate interposed therebetween, but the solid-state battery of the present invention is not limited thereof and has a configuration in which external terminals can be relatively freely arranged.

In the solid-state battery of the present invention, the degree of freedom in installation of external terminals is high, and for example, as illustrated in FIGS. 1(a) to 1(f), a positive electrode external terminal 400A and a negative electrode external terminal 400B can be provided also with respect to any of side surfaces of a solid-state battery laminate 500 (that is, any of surfaces of the laminate existing in a direction orthogonal to the lamination direction in the solid-state battery laminate). The "side surface" described herein refers to a plurality of side surface formed by the solid-state battery (more specifically, the solid-state battery laminate) in a broad sense. In a narrow sense, the "side surface" refers to a plurality of planar and/or curved side surfaces in the solid-state battery (more specifically, the solid-state battery laminate).

Figure 2:
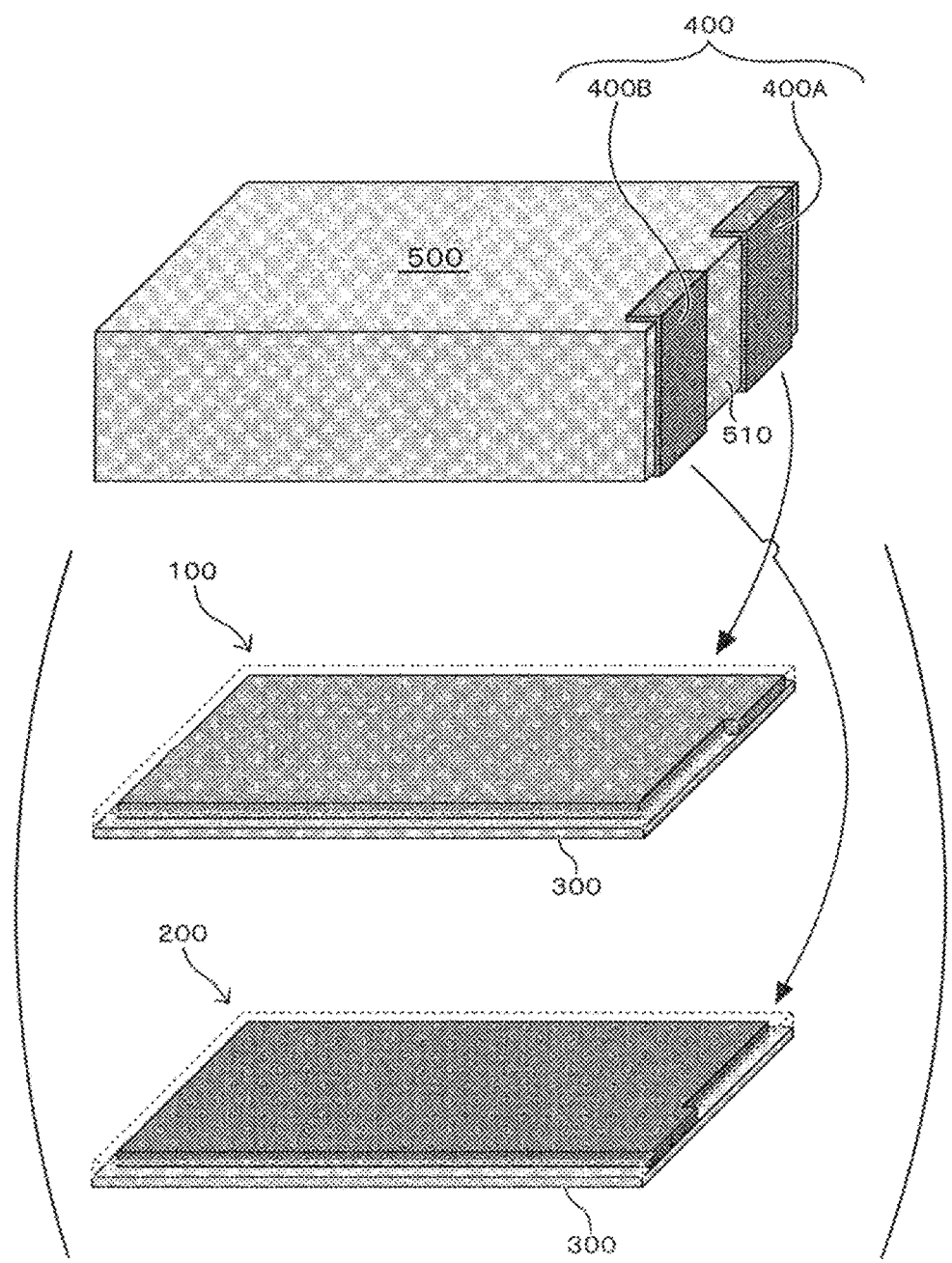
FIG. 2 is a schematic perspective view for describing features of a solid-state battery according to an embodiment of the present invention.
Figure 3:
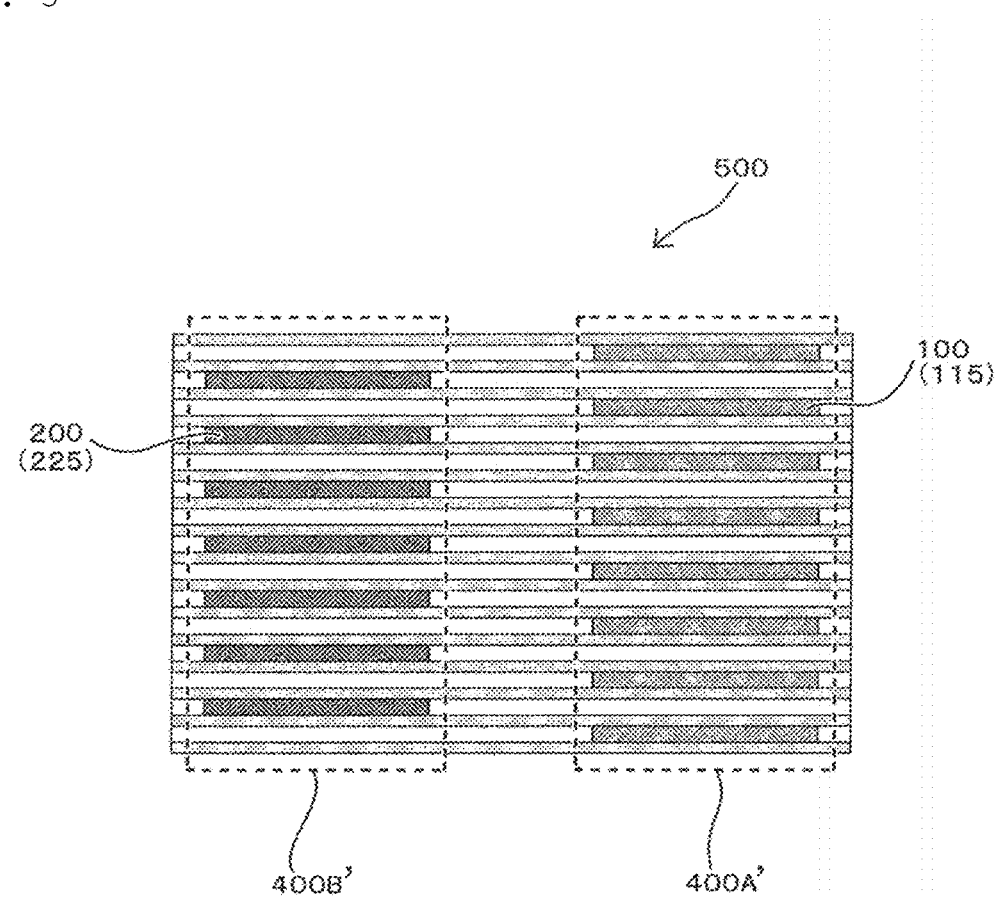
FIG. 3 is a schematic side view for describing features of the solid-state battery according to the embodiment of the present invention.
Figure 4:
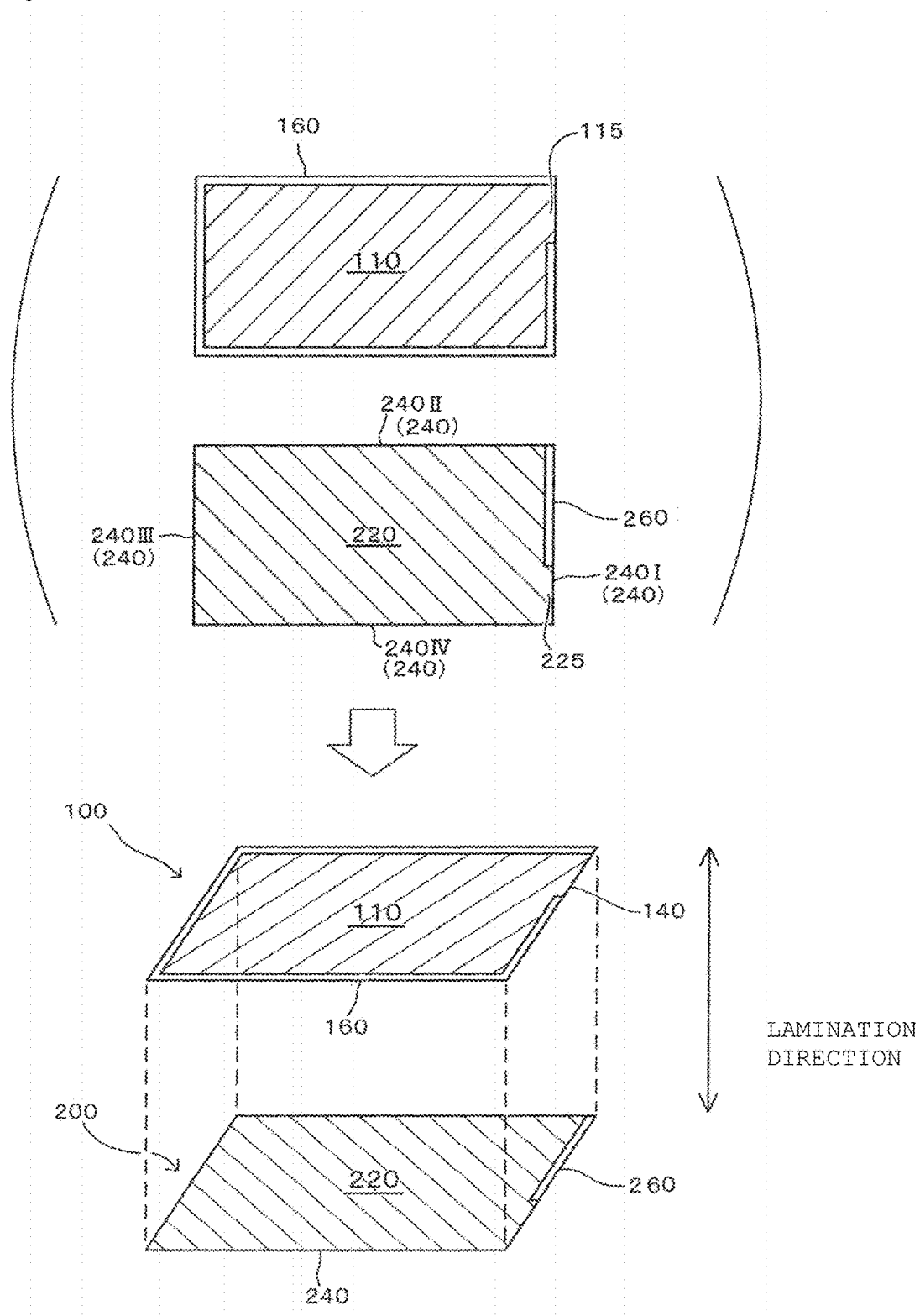
FIG. 4 is a schematic plan view for describing features of the solid-state battery according to the embodiment of the present invention.

The present invention will be specifically described in detail first using embodiments illustrated in FIGS. 2 to 4 as an example. In the solid-state battery laminate 500 illustrated in FIGS. 2 to 4, the positive electrode external terminal 400A and the negative electrode external terminal 400B are positioned with respect to the same side surface (particularly, see FIG. 2). In other words, the positive electrode external terminal and the negative electrode external terminal illustrated herein do not face each other with the solid-state battery laminate interposed therebetween, but are arranged to be adjacent to each other on one side surface of the solid-state battery laminate.

In the solid-state battery of the present invention capable of adopting such an arrangement configuration of external terminals, the positive electrode layer and the negative electrode layer have a characteristic relation in terms of the contour (the outermost peripheral edge) of the solid-state battery laminate. Specifically, an active material contour portion in which an electrode active material is provided to extend to a plan-view contour of the solid-state battery laminate in one of the positive electrode layer and the negative electrode layer and a non-active material contour portion in which an electrode active material is not provided to extend to the plan-view contour of the solid-state battery laminate in the other of the positive electrode layer and the negative electrode layer face each other in a lamination direction. It can also be said that the active material contour portion in which an electrode active material is provided to extend to a plan-view contour of the solid-state battery laminate in one of the positive electrode layer and the negative electrode layer and the non-active material contour portion in which an electrode active material is not provided to extend to the plan-view contour of the solid-state battery laminate in the other of the positive electrode layer and the negative electrode layer as described above are aligned along the lamination direction of the solid-state battery laminate. In the embodiment illustrated in FIG. 4, an active material contour portion 240 in which an electrode active material is provided to extend to a plan-view contour of the solid-state battery laminate in the negative electrode layer 200 and a non-active material contour portion 160 in which an electrode active material is not provided to extend to the plan-view contour of the solid-state battery laminate in the positive electrode layer 100 face each other in the lamination direction. In other words, in the present invention, when the positive electrode layer 100 and the negative electrode layer 200 are overlapped with each other in plan view, at least one of the active material contour portions and the other of the non-active material contour portions overlap each other (see FIG. 4).

In the solid-state battery of the present invention, when the above-described active material contour portion and non-active material contour portion are regarded as first contour portions, second contour portions also preferably face each other in the lamination direction. More specifically, when the active material contour portion in which an electrode active material is provided to extend to a plan-view contour of the solid-state battery laminate in one of the positive electrode layer and the negative electrode layer and the non-active material contour portion in which an electrode active material is not provided to extend to the plan-view contour in the other of the positive electrode layer and the negative electrode layer face each other in the lamination direction, it is preferable that a second active material contour portion in which an electrode active material is provided to extend to a plan-view contour of the solid-state battery laminate in the other of the positive electrode layer and the negative electrode layer and a second non-active material contour portion in which an electrode active material is not provided to extend to the plan-view contour in the one of the positive electrode layer and the negative electrode layer face each other in the lamination direction. In such a solid-state battery, it is preferable that a surface on which the active material contour portion and the non-active material contour portion face each other (that is, a surface facing the first contour portion) and a surface on which the second active material contour portion and the second non-active material contour portion face each other are different from each other For example, in the embodiment illustrated in FIG. 4, the active material contour portion 240 (that is, the first active material contour portion) in which an electrode active material is provided to extend to the plan-view contour of the solid-state battery laminate in the negative electrode layer 200 and the non-active material contour portion 160 (that is, the first non-active material contour portion) in which an electrode active material is not provided to extend to the plan-view contour of the solid-state battery laminate in the positive electrode layer 100 face each other in the lamination direction, and a second active material contour portion 260 in which an electrode active material is provided to extend to the plan-view contour of the solid-state battery laminate in the negative electrode layer 200 and a second non-active material contour portion 140 in which an electrode active material is not provided to extend to the plan-view contour of the solid-state battery laminate in the positive electrode layer 100 face each other in the lamination direction. In such a case, the solid-state battery laminate preferably includes an embodiment in which such a surface (laminate surface) facing the first contour portion and such a surface (laminate surface) facing the second contour portion are different from each other, that is, the solid-state battery laminate preferably includes such different surfaces.

In the present invention, such a facing relation between the contour portions in the lamination direction relates to relatively free arrangement of external terminals of the positive electrode and the negative electrode. The external terminal is provided to be in contact with the active material contour portion. Specifically, in the solid-state battery of the present invention, one of the positive electrode external terminal and the negative electrode external terminal is provided to be in contact with the active material contour portion in one of the positive electrode layer and the negative electrode layer, and the other of the positive electrode external terminal and the negative electrode external terminal is provided to be in contact with the active material contour portion on which the electrode active material is provided to extend to the plan-view contour of the battery laminate in the active material contour portion in the other of the positive electrode layer and the negative electrode layer. In the present invention, as long as the contour portion maintains the facing relation in the lamination direction, the external terminal of one of the electrodes can be provided to be in contact with the active material contour portion of the one of the electrodes and can be relatively freely arranged. Similarly, as long as the facing relation in the lamination direction is maintained, the external terminal of the other of the electrodes can also be provided to be in contact with the active material contour portion of the other of the electrodes (preferably, a portion which may correspond to the contour portion excluding the above-described non-active material contour portion) and can be relatively freely arranged. According to the present invention, although being merely a preferred example, the installation position of the external terminal can be relatively easily changed without greatly changing the design of the solid-state battery adopted once (particularly, matters related to the embodiment of the positive electrode layer and the negative electrode layer in the solid-state battery laminate, matters related thereto, and the like).

For example, in the solid-state battery of the present invention, a surface of the solid-state battery laminate provided with the positive electrode external terminal and the surface of the solid-state battery laminate provided with the negative electrode external terminal may be different from each other. For example, one external terminal of the positive electrode external terminal and the negative electrode external terminal which is in contact with the active material contour portion (that is, the first active material contour portion) in one of the positive electrode layer and the negative electrode layer may be provided on the side surface of the solid-state battery laminate, and the other external terminal of the positive electrode external terminal and the negative electrode external terminal which is in contact with the second active material contour portion may be provided on a side surface different from that side surface of the solid-state battery laminate. The positive electrode external terminal and the negative electrode external terminal may extend in a direction along the lamination direction of the solid-state battery laminate in mutually different side surfaces of the solid-state battery laminate. In the solid-state battery of the present invention, as illustrated in FIGS. 1(*b*), 1(*d*), and 1(*e*), one and the other of the positive electrode external terminal and the negative electrode external terminal can also be provided on side surfaces adjacent to each other (that is, side surfaces which do not face each other). It can also be said that the positive electrode external terminal and the negative electrode external terminal may be individually provided with respect to adjacent side surfaces continuous to each other that are mutually different side surfaces which do not face each other among a plurality of surfaces of the solid-state battery laminate. As described above, the active material contour portion and the non-active material contour portion of the present invention contribute to a unique arrangement configuration of external terminals and a more versatile solid-state battery may be provided.

In plan view illustrated in FIG. 4, the positive electrode external terminal is provided on the active material contour portion represented by reference numeral 140 on the positive electrode side; on the other hand, the negative electrode external terminal can be provided with respect to any place as long as it is the active material contour portion represented by reference numeral 240 on the negative electrode side. That is, in the case of sides forming the plan-view contour, although not limited to the active material contour portion on the side represented by reference numeral 240I, the negative electrode external terminal can be provided on the active material contour portions (any of reference numerals 240II, 240III, and 240IV) at three sides forming the other plan-view contour.

As can be seen from the embodiment illustrated in the upper view of FIG. 2, in the solid-state battery of the present invention, the solid-state battery laminate 500 may have a rectangular parallelepiped as a whole. The term "rectangular parallelepiped" described herein is not limited to a complete rectangular parallelepiped, and may be widely interpreted including a three-dimensional shape of a substantially rectangular parallelepiped that is regarded as being changed on the basis of the complete rectangular parallelepiped. For example, the "rectangular parallelepiped" is not limited to a complete rectangular parallelepiped as a geometric configuration thereof, also includes a cube, and further includes a shape that can still be included in the concept of a rectangular parallelepiped or a cube also in a case where such a rectangular parallelepiped shape or a cube shape is sectionally missed or deformed, as roughly understood. For explanatory convenience, description will be made hereinafter while the "rectangular parallelepiped" is also referred to as the "substantially rectangular parallelepiped".

When the solid-state battery laminate has such a substantially rectangular parallelepiped as a whole, the solid-state battery of the present invention has a configuration in which the positive electrode external terminal and the negative electrode external terminal can be provided also with respect to any side surface of the "rectangular parallelepiped". That is, the solid-state battery of the present invention has a configuration having a high degree of freedom in degree in terms of arrangement of external terminals. In the exemplary embodiments of FIGS. 2 and 3, the external terminals are collectively arranged with respect to a side surface as an embodiments of such a relatively free design of external terminals. Specifically, both the positive electrode external terminal 400A and the negative electrode external terminal 400B are provided side by side and proximal to each other on a "same side surface" 510 corresponding to one side surface of the substantially rectangular parallelepiped. For example, the external terminals on both the positive electrode side and the negative electrode side may be positioned with respect to a side surface having an area smaller than a main surface having the largest area (in the solid-state battery laminate illustrated in FIGS. 1(*a*) to 1(*f*), a surface forming an upper surface and/or a lower surface of the solid-state battery laminate) in the solid-state battery laminate.

In a preferred embodiment, one of the active material contour portions in the positive electrode layer and the negative electrode layer is provided on at least two sides selected from sides forming the plan-view contour of the battery laminate, and the other of the non-active material contour portions in the positive electrode layer and the negative electrode layer is provided on at least two sides selected from sides forming the plan-view contour of the battery laminate. That is, for example, the active material contour portion in the positive electrode layer is provided on at least two sides selected from sides forming the plan-view contour of the battery laminate; on the other hand, the non-active material contour portions in the negative electrode layer is provided on at least two sides selected from the sides forming the plan-view contour of the battery laminate. Alternatively, the active material contour portion in the negative electrode layer is provided on at least two sides selected from sides forming the plan-view contour of the battery laminate; on the other hand, the non-active material contour portions in the positive electrode layer is provided on at least two sides selected from the sides forming the plan-view contour of the battery laminate. With reference to the drawings, this embodiment may have an embodiment in which the plan view of the battery laminate in the positive electrode layer and the negative electrode layer is as illustrated, for example, in FIGS. 5 to 10.

Figure 5:
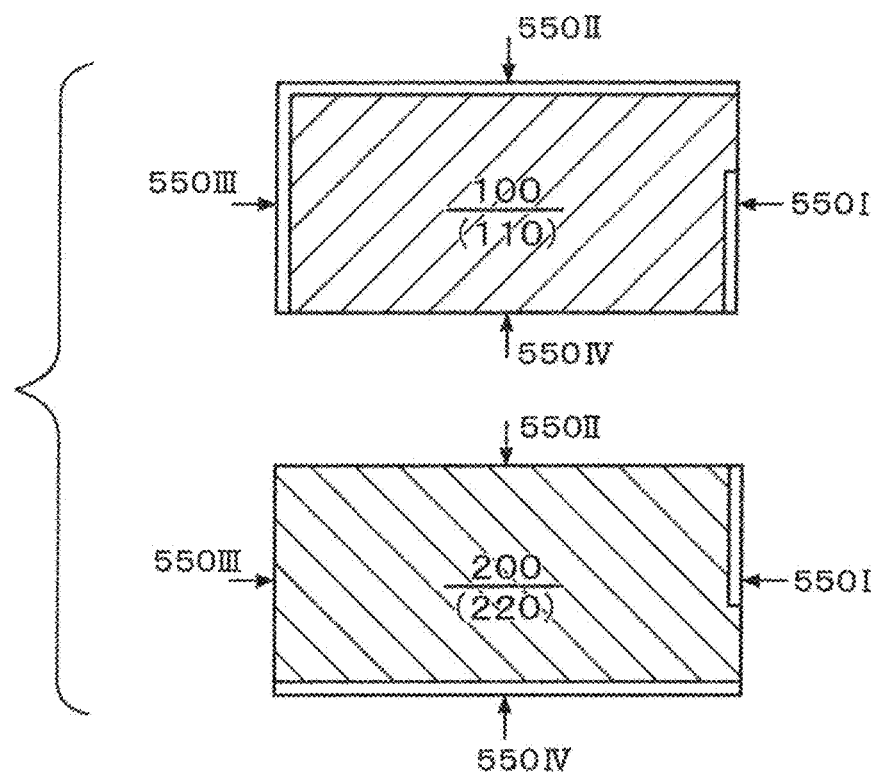
FIG. 5 is a schematic plan view for describing an exemplary embodiment of one of active material contour portions and the other of non-active material contour portions in a positive electrode layer and a negative electrode layer.
Figure 6:
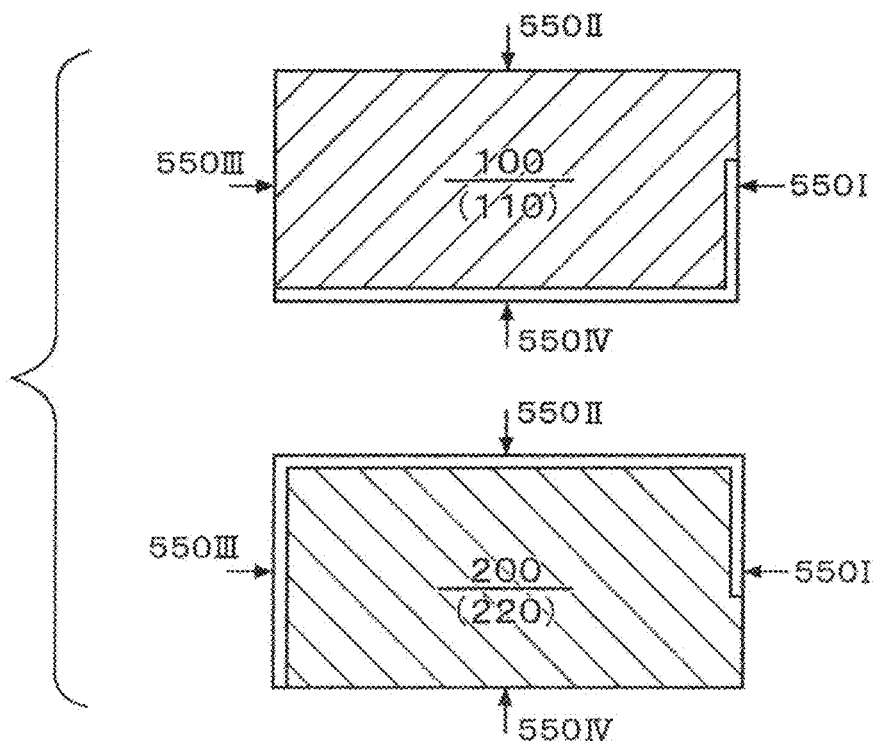
FIG. 6 is a schematic plan view for describing an exemplary embodiment of one of active material contour portions and the other of non-active material contour portions in the positive electrode layer and the negative electrode layer.
Figure 7:
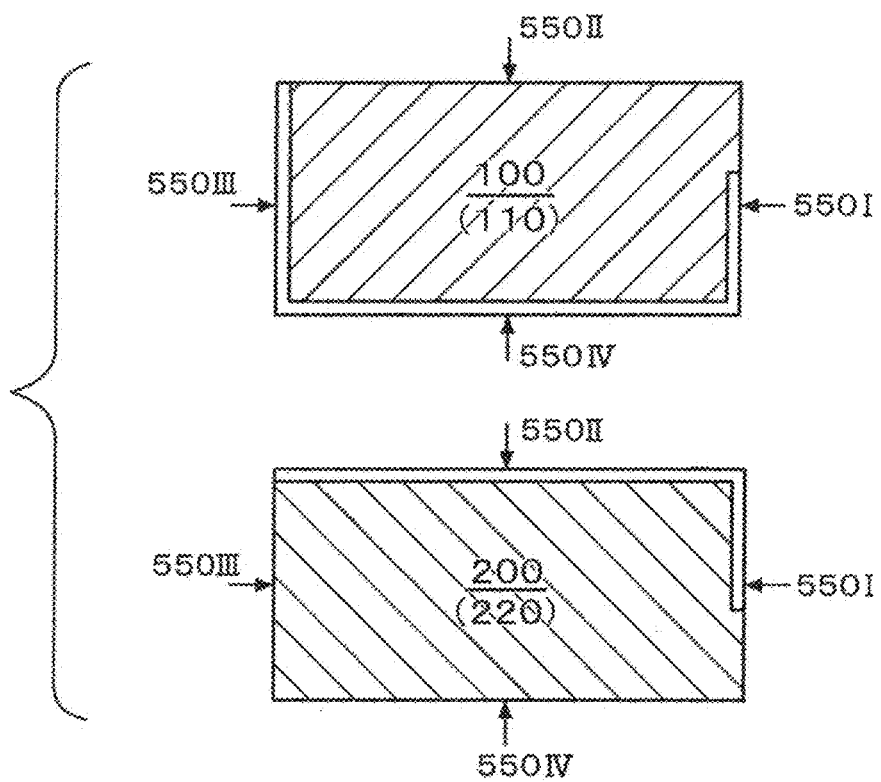
FIG. 7 is a schematic plan view for describing an exemplary embodiment of one of active material contour portions and the other of non-active material contour portions in the positive electrode layer and the negative electrode layer.
Figure 8:
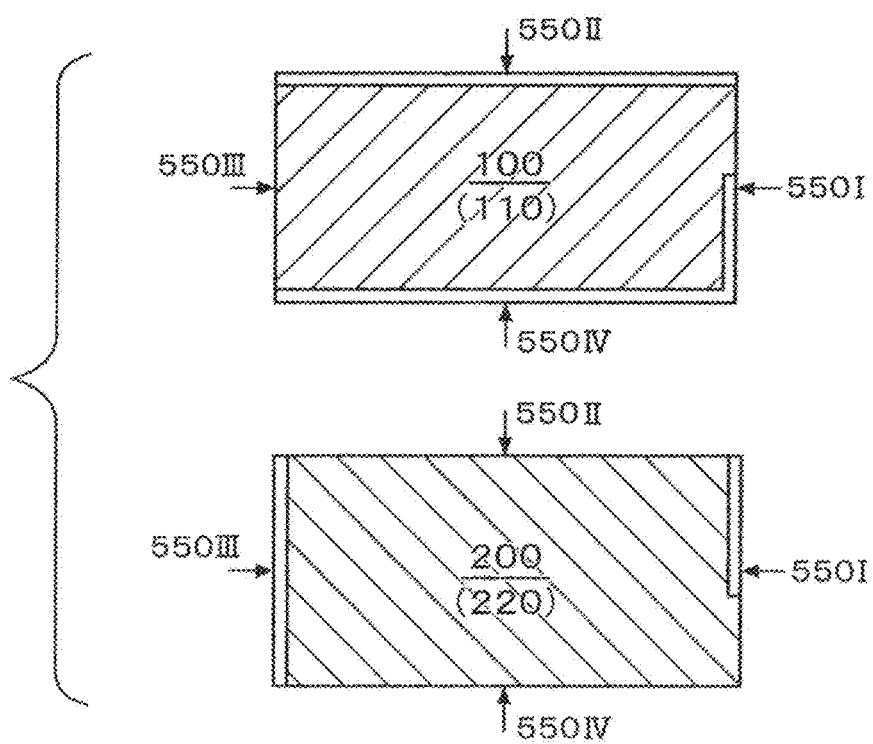
FIG. 8 is a schematic plan view for describing an exemplary embodiment of one of active material contour portions and the other of non-active material contour portions in the positive electrode layer and the negative electrode layer.
Figure 9:
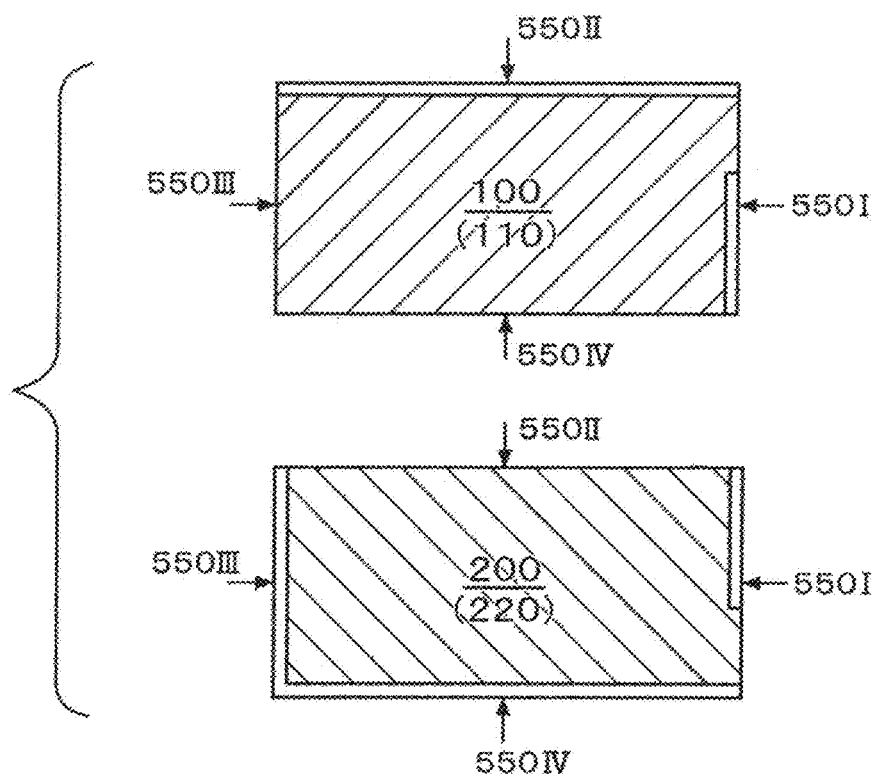
FIG. 9 is a schematic plan view for describing an exemplary embodiment of one of active material contour portions and the other of non-active material contour portions in the positive electrode layer and the negative electrode layer.
Figure 10:
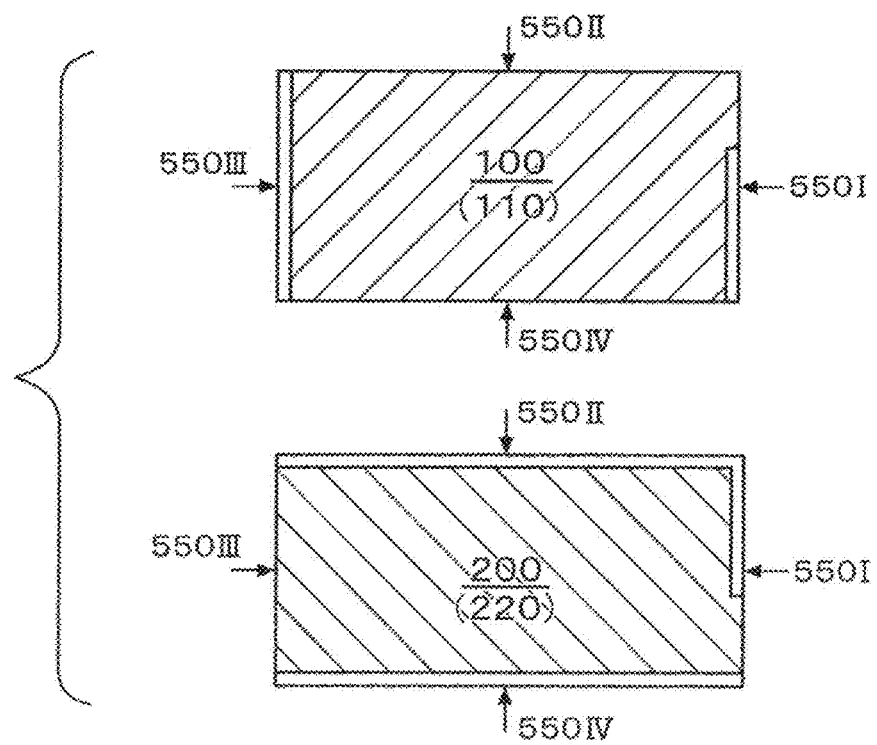
FIG. 10 is a schematic plan view for describing an exemplary embodiment of one of active material contour portions and the other of non-active material contour portions in the positive electrode layer and the negative electrode layer.

In FIG. 5, the active material contour portion in the negative electrode layer 200 is provided with respect to sides 550I, 550II, and 550III among sides (550I to 550IV) forming the plan-view contour of the battery laminate, and the non-active material contour portion in the positive electrode layer 100 is provided with respect to the sides 550I, 550II, and 550III among the sides (550I to 550IV) forming the plan-view contour of the battery laminate. In such a case, the negative electrode external terminal can be provided on any active material contour portion of the sides 550I, 550II, and 550III, and the positive electrode external terminal can be provided with respect to the contour portion corresponding to a portion other than the non-active material contour portion. Similarly, in FIG. 6, the active material contour portion in the negative electrode layer 200 is provided with respect to the sides 550I and 550IV among the sides forming the plan-view contour of the battery laminate, and the non-active material contour portion in the positive electrode layer 100 is provided with respect to the sides 550I and 550IV among the sides forming the plan-view contour of the battery laminate. In such a case, the negative electrode external terminal can be provided on any active material contour portion of the sides 550I and 550IV, and the positive electrode external terminal can be provided with respect to the contour portion corresponding to a portion other than the non-active material contour portion. In FIG. 7, the active material contour portion in the negative electrode layer 200 is provided with respect to the sides 550I, 550III, and 550IV among the sides forming the plan-view contour of the battery laminate, and the non-active material contour portion in the positive electrode layer 100 is provided with respect to 550I, 550III, and 550IV among the sides forming the plan-view contour of the battery laminate. In such a case, the negative electrode external terminal can be provided on any active material contour portion of the sides 550I, 550III, and 550IV, and the positive electrode external terminal can be provided with respect to the contour portion corresponding to a portion other than the non-active material contour portion. The same applies to other embodiments of FIGS. 8 to 10.

Figure 11:
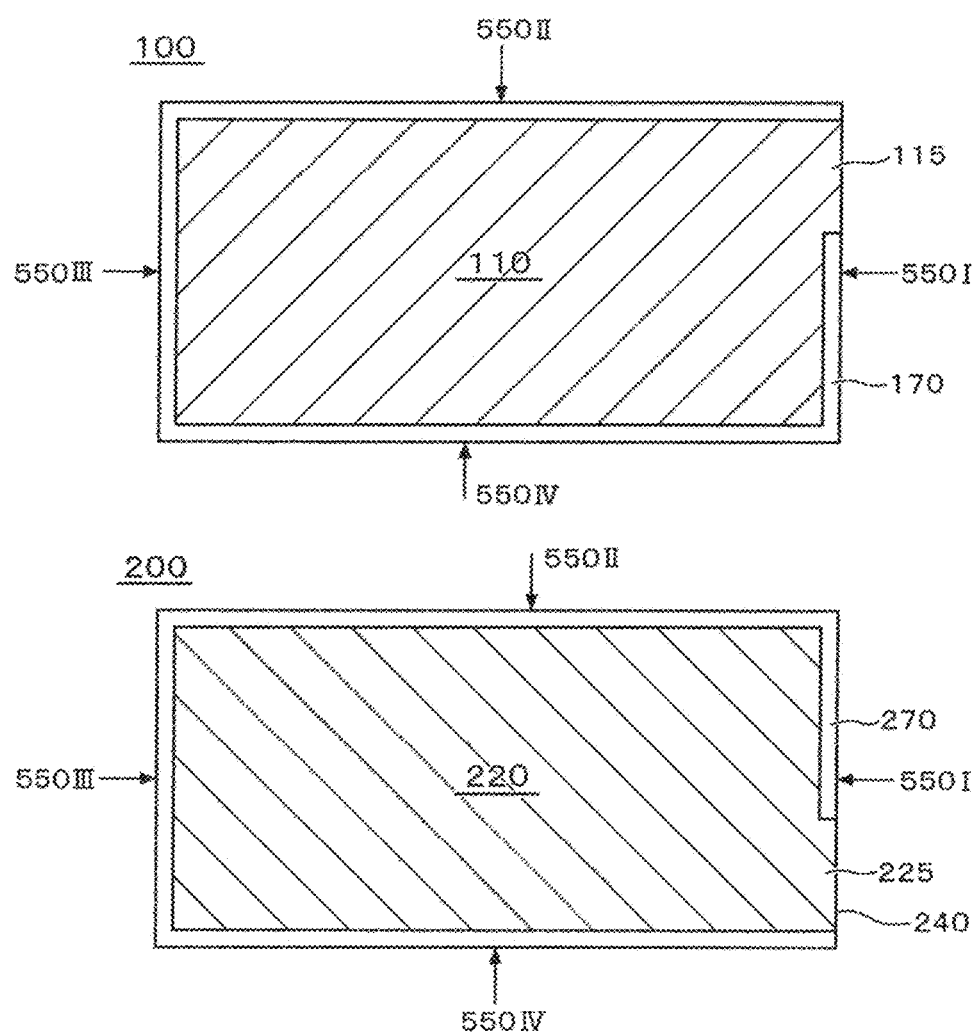
FIG. 11 is a schematic plan view for describing an exemplary embodiment of one of active material contour portions and the other of non-active material contour portions in the positive electrode layer and the negative electrode layer.

In the present invention, an exemplary embodiment illustrated in FIG. 11 is also conceivable. In the embodiment illustrated in the drawing, the active material contour portion 240 is provided on one side (550I) among the sides forming the plan-view contour of the battery laminate for the negative electrode layer 200. Thus, also taking into consideration of such an embodiment, in the present invention, one of the active material contour portions in the positive electrode layer and the negative electrode layer may be provided on at least one side selected from sides forming the plan-view contour of the battery laminate, and the other of the non-active material contour portions in the positive electrode layer and the negative electrode layer may be provided on at least one side selected from sides forming the plan-view contour of the battery laminate. In the present invention, including such matters, the external terminals of the positive electrode and the negative electrode can have a relatively free arrangement configuration.

Figure 12:
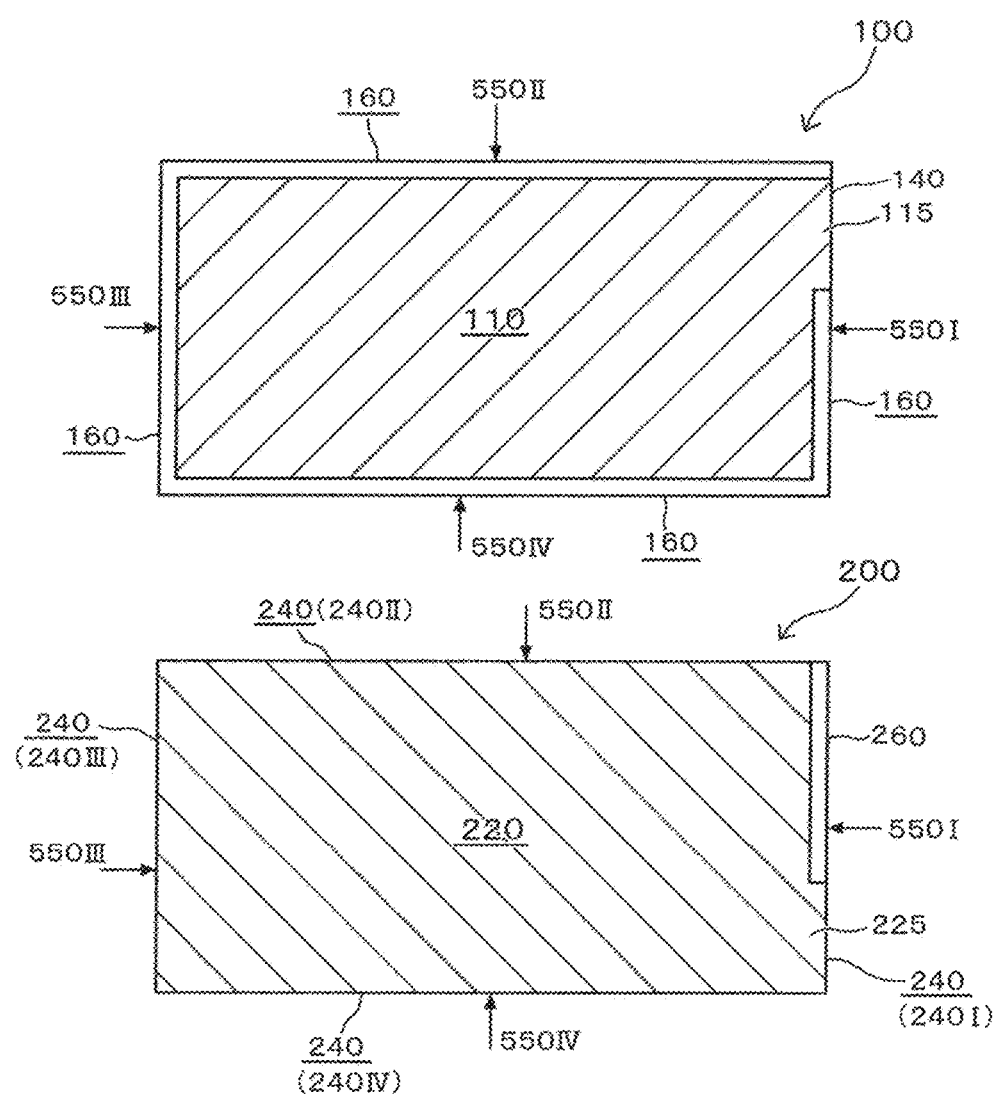
FIG. 12 is a schematic plan view for describing an exemplary embodiment of one of active material contour portions and the other of non-active material contour portions in the positive electrode layer and the negative electrode layer.

Furthermore, in the present invention, an exemplary embodiment illustrated in FIG. 12 is also conceivable. In the embodiment illustrated in the drawing, the active material contour portion 240 in the negative electrode layer 200 is provided on four sides 550I, 550II, 550III, and 550IV forming the plan-view contour of the battery laminate, and the non-active material contour portion 160 in the positive electrode layer 100 is provided on four sides 550I, 550II, 550III, and 550IV forming the plan-view contour of the battery laminate. Thus, also taking into consideration of such an embodiment, in the present invention, one of the active material contour portions in the positive electrode layer and the negative electrode layer may be provided on all sides of sides forming the plan-view contour of the battery laminate, and the other of the non-active material contour portions in the positive electrode layer and the negative electrode layer may be provided on all sides of sides forming the plan-view contour of the battery laminate. In the present invention, including such matters, the external terminals of the positive electrode and the negative electrode can have a relatively free arrangement configuration.

As can be seen from FIGS. 5 to 12 referred to above, the "active material contour portion" is provided on a side forming the plan-view contour of the battery laminate, and the active material contour portion may be provided so as to satisfy all portions of the side or the active material contour portion may be provided so as to satisfy at least a part of a target side although not limited. Similarly, the "non-active material contour portion" is provided on a side forming the plan-view contour of the battery laminate, and the non-active material contour portion may be provided so as to satisfy all portions of the side or the non-active material contour portion may be provided so as to satisfy at least a part of a target side although not limited. The "active material contour portion" may be continuous between adjacent sides in the sides forming the plan-view contour of the battery laminate. Similarly, the "non-active material contour portion" may also be continuous between adjacent sides in the sides forming the plan-view contour of the battery laminate.

In the solid-state battery of the present invention, as described above, the surface facing the first contour portion and the surface facing the second contour portion may be different from each other between the positive electrode layer and the negative electrode layer. For example, taking FIG. 12 as one example, a surface where the first active material contour portion 240 of the negative electrode layer 200 and the first non-active material contour portion 160 of the positive electrode layer 100 face each other is "any surface of the sides 550II to 550IV", and a surface where the second non-active material contour portion 260 of the negative electrode layer 200 and the second active material contour portion 140 of the positive electrode layer 100 face each other is the "surface of the side 550I".

In a preferred embodiment, the electrode layer has a narrowed portion in the active material region. More specifically, the positive electrode layer 100 may have a narrowed shape narrowed toward a side forming the plan-view contour, and similarly, the negative electrode layer 200 may also have a narrowed shape narrowed toward a side on which the negative electrode active material region forms the plan-view contour (see FIGS. 2 to 4). In other words, the positive electrode layer 100 preferably has the positive electrode narrowed portion 115 in which the positive electrode active material region 110 is narrowed toward the side forming the plan-view contour, and similarly, the negative electrode layer 200 also preferably has the negative electrode narrowed portion 225 in which the negative electrode active material region 220 is narrowed toward the side forming the plan-view contour (see the upper view of FIG. 4).

When such an electrode narrowed portion is provided, it becomes easy to adopt a configuration that enables the external terminals on both the positive electrode side and the negative electrode side to be positioned on the same side surface of the solid-state battery laminate. This is because the positive electrode narrowed portion and the negative electrode narrowed portion do not face each other in the lamination direction in the battery laminate, and thus a short circuit between the positive electrode external terminal and the negative electrode external terminal can be suitably prevented also in the "arrangement on the same side surface". For example, in embodiments illustrated in FIGS. 2 and 3, the positive electrode external terminal 400A and the negative electrode external terminal 400B are positioned on the same side surface of the solid-state battery laminate so as to be side by side with each other. It can also be said that a positive electrode extending portion 400A' and a negative electrode extending portion 400B' are arranged side by side or proximal to each other (see FIG. 3).

When the positive electrode external terminal and the negative electrode external terminal are provided on the same side surface, this configuration brings about an advantageous effect particularly for surface mounting applications. Specifically, the solid-state battery of the present invention in which the external terminals on both the positive electrode side and the negative electrode side are positioned on the same side surface of the solid-state battery laminate is a battery more suitable for mounting on a substrate such as a printed wiring board or a motherboard. In particular, when a battery is surface-mounted with the "same side surface" on which both the external terminals are provided as the mounting-side surface, adverse influences attributable to expansion of the solid-state battery may be avoided. When the solid-state battery mounted on the substrate is expanded due to charging and discharging and/or thermal expansion, and the like, the solid-state battery may come into contact with or collide with the substrate; however, in the present invention, such a disadvantageous contact or collision is avoided. The reason for this is that, when a battery is mounted with the "same side surface" on which both the external terminals are provided as the mounting-side surface, that is, when this side surface is the closest surface as a surface closest to the substrate as a whole, expansion occurs in a direction orthogonal to a direction in which the solid-state battery (particularly, the solid-state battery laminate 500) and a substrate 600 face each other (see FIG. 13).

Figure 13:
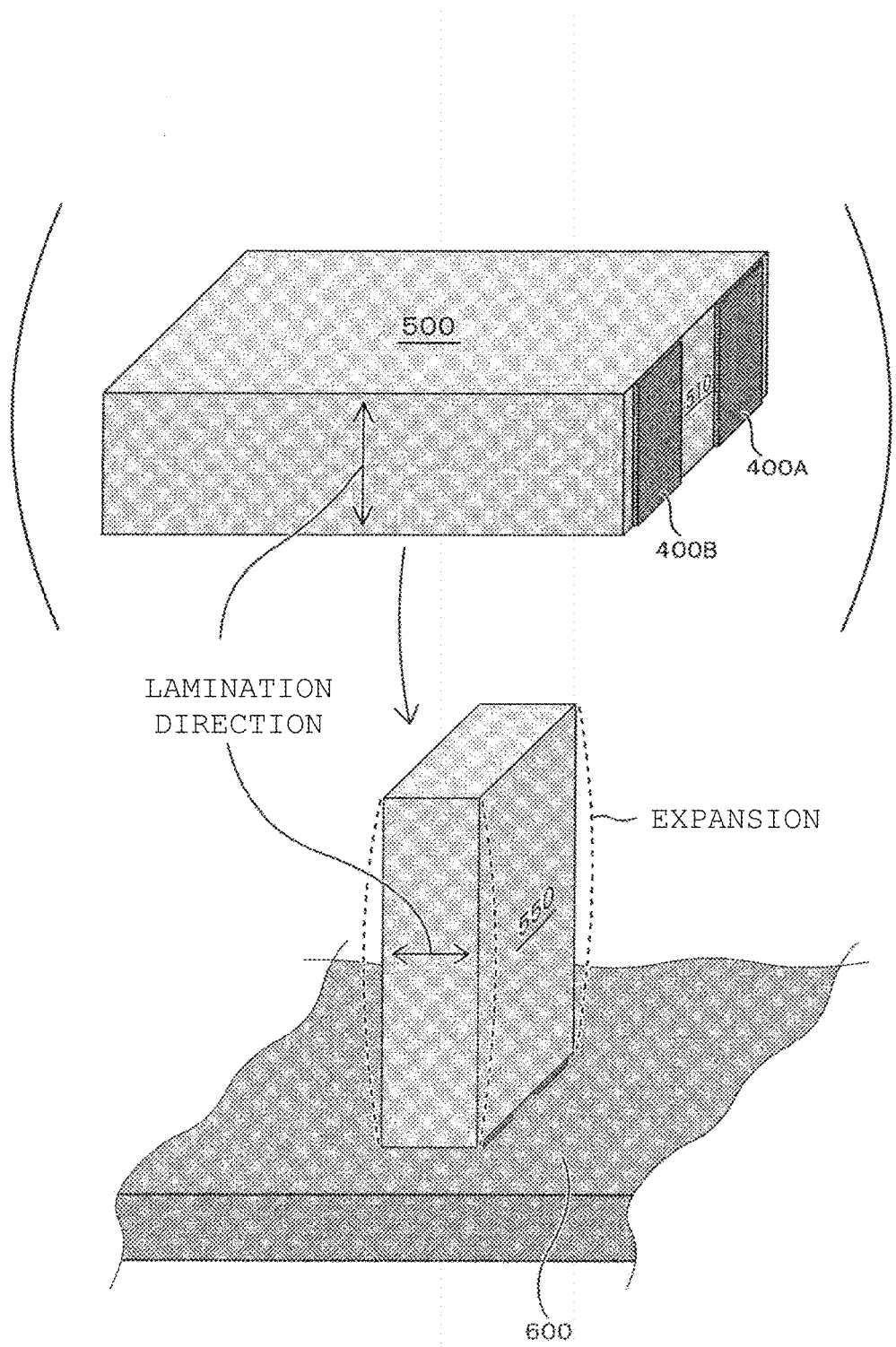
FIG. 13 is a schematic perspective view for describing the solid-state battery to be surface-mounted.

As illustrated in FIG. 13, each of the positive electrode external terminal 400A and the negative electrode external terminal 400B may not be provided to extend to other surfaces continuous to the surfaces on which these external terminals are provided. In the embodiment illustrated in FIG. 13, each of the positive electrode external terminal 400A and the negative electrode external terminal 400B terminates at a boundary edge between the side surface on which these external terminals are provided and the main surface continuous to the side surface (for example, each of both facing main surfaces of the solid-state battery laminate). In such a case, since the external terminals do not extend long to the other continuous surfaces, it becomes easy to reduce the height or size of the solid-state battery as a whole.

Figure 14:
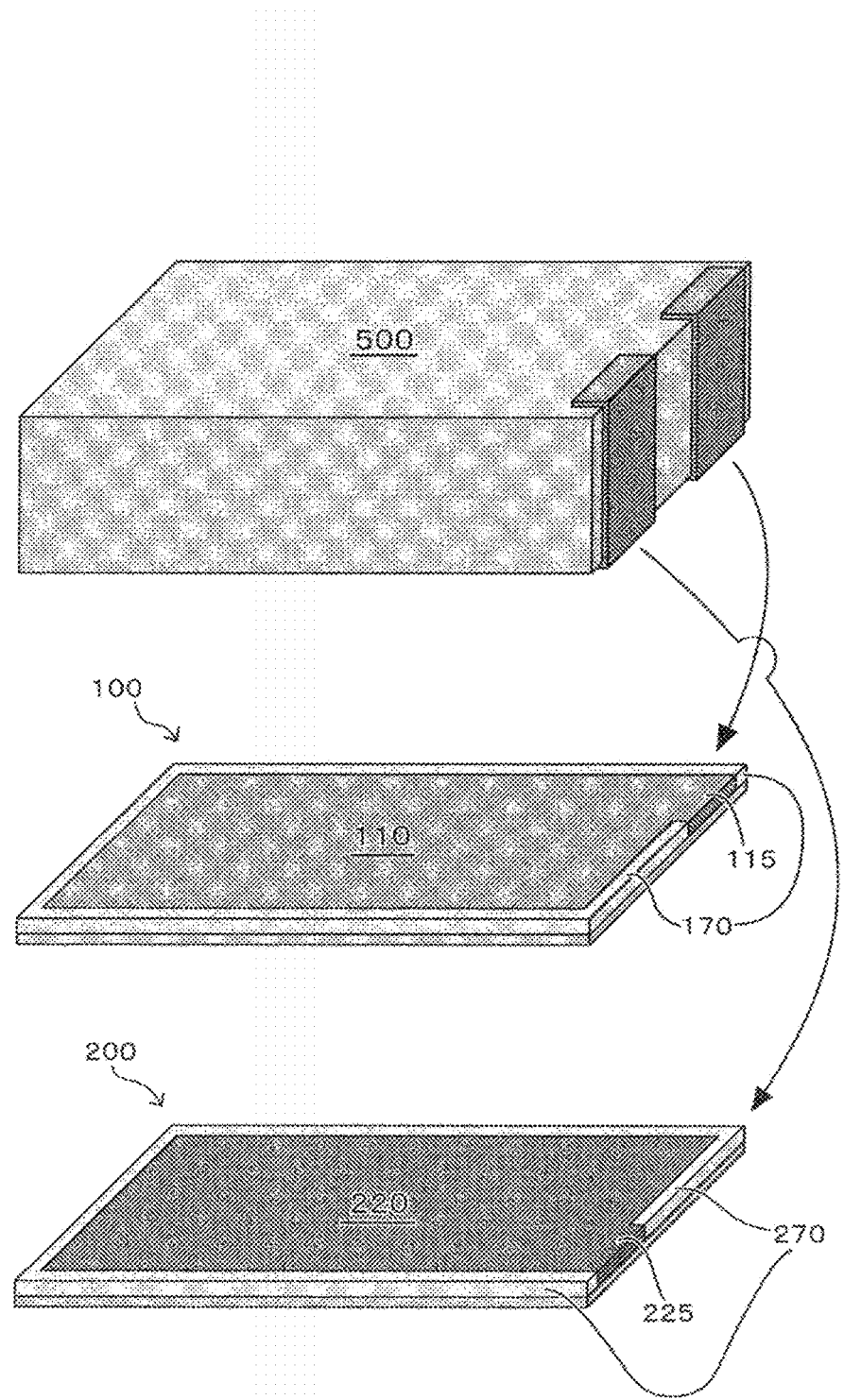
FIG. 14 is a schematic perspective view for describing a non-active material region.

Here, the non-active material contour portion will be described in detail. The non-active material contour portion is a region where the electrode active material is not provided to extend to the contour in plan view of the battery laminate. That is, the non-active material contour portion brings a non-active material region to the peripheral edge portion of the battery laminate. The non-active material region is typically a region having an insulation property. More specifically, the non-active material region preferably has at least an electronic insulation property. As the material for the non-active material region, materials commonly used as a "non-active material" for the solid-state battery may be used, and for example, materials including a resin material, a glass material and/or a ceramic material, and the like may be used. As long as a desired electronic insulation property is secured, the non-active material region may additionally contain a solid electrolyte material as a material therefor. When the electrode narrowed portion is provided, as illustrated in FIG. 14, in the positive electrode layer, a portion 170 around the positive electrode narrowed portion 115 corresponds to a non-active material region where the positive electrode active material is not provided. Similarly, in the negative electrode layer, a portion 270 around the negative electrode narrowed portion 225 corresponds to a non-active material region where the negative electrode active material is not provided. From the viewpoint of producing by means of firing, the non-active material region may have a sintered body form. Although being merely an example, examples of a material contained in the non-active material region may include at least one selected from the group consisting of soda lime glass, potassium glass, borate-based glass, borosilicate-based glass, barium borosilicate-based glass, bismuth zinc borate-based glass, bismuth silicate-based glass, phosphate-based glass, aluminophosphate-based glass, and zinc phosphate-based glass. The ceramic material contained in the non-active material region is not particularly limited, but examples thereof may include at least one selected from the group consisting of aluminum oxide, boron nitride, silicon dioxide, silicon nitride, zirconium oxide, aluminum nitride, silicon carbide, and barium titanate. As can be seen from FIG. 14, the non-active material region (170, 270) can also be referred to as a "margin portion" or a "negative portion" because of its form. For example, the width dimension of the non-active material region (the margin portion/the negative portion) in plan view may be about 0.2 mm to 0.8 mm, and is preferably about 0.3 mm to 0.6 mm.

In plan view as illustrated in the drawing, in the solid-state battery of the present invention, the negative electrode active material region and the positive electrode active material region may have different areas. For example, the area of the negative electrode active material region in plan view may be larger than the area of the positive electrode active material region in plan view, and according to this, a disadvantageous phenomenon such as generation of so-called dendrites can be further suppressed. For example, referring to FIG. 11, the width dimension of the non-active material region 270 corresponding to the negative portion around the negative electrode narrowed portion 225 in the negative electrode layer 200 may be smaller than the width dimension of the non-active material region 170 corresponding to the negative portion around the positive electrode narrowed portion 115 in the positive electrode layer 100. This is because such a configuration effectively contributes to a relatively large area of the negative electrode active material region 110 in plan view.

In an exemplary embodiment illustrated in FIG. 12, the area of the negative electrode active material region 220 in plan view is larger than the area of the positive electrode active material region 110 in plan view as described above, but this embodiment is preferable in terms of battery capacity since all the portions of the sides (that is, three sides 550II, 550III, and 550IV) other than the side 550I on which the negative electrode narrowed portion 225 is provided in the negative electrode layer 200 are the active material contour portions. Therefore, in the solid-state battery having the configuration illustrated in FIG. 12, it becomes easy to increase a battery capacity while suppressing a disadvantageous phenomenon such as generation of dendrites. In the solid-state battery having the configuration illustrated in FIG. 12, as for the arrangement of external terminals, the positive electrode external terminal is provided to be in contact with the positive electrode narrowed portion 115, but the negative electrode external terminal can be provided also on any active material contour portion of four sides (550I, 550II, 550III, and 550IV). That is, the negative electrode external terminal can be provided also with respect to any of the active material contour portions 240I, 240II, 240III, and 240IV illustrated in the drawing. Based on such a viewpoint, it can be said that the solid-state battery according to the present invention has a configuration in which the degree of freedom in installation of, particularly, the negative electrode external terminal is high, that is, the degree of freedom in extending of the negative electrode.

The present invention can be embodied in various embodiments. This will be described below.

(Embodiment of External Terminals Extending Short)

This embodiment is an embodiment in which the external terminals are provided relatively short. In FIGS. 1(a) and 2 referred to in the solid-state battery described above, the external terminal 400 are provided to sectionally protrude from the "same side surface". For example, as can be seen with reference to FIG. 2, in the above-described solid-state battery, each of the positive electrode external terminal 400A and the negative electrode external terminal 400B extends to the main surface facing the solid-state battery laminate 500 with the "same side surface" 510 interposed therebetween. On the other hand, as illustrated in FIG. 13, in the solid-state battery according to this embodiment, each of the positive electrode external terminal 400A and the negative electrode external terminal 400B is positioned only on the "same side surface" 510 and does not extend to main surface of the solid-state battery laminate 500.

In the solid-state battery of this embodiment, the external terminals do not extend onto the main surface, and this configuration can achieve a reduction in height or size of the solid-state battery as a whole (see the upper view of FIG. 13). When the solid-state battery of the present invention is a surface mount device (SMD)-type solid-state battery to be surface-mounted as illustrated in the lower view of FIG. 13, the external terminals are positioned only between the substrate and the solid-state battery. Thus, when the external terminals do not extend to the main surface, the mounted solid-state battery is less likely to cause undesirable interaction with other electronic components, and a more reliable solid-state battery can be obtained. In the case of a solid-state battery to be surface-mounted, the solid-state battery may have a size that enables the battery to be mounted on the substrate. For example, the solid-state battery may have the same size as other electronic components (for example, active elements and/or passive elements) to be mounted on the substrate. Although being merely an example, at least one side dimension of the solid-state battery laminate having a rectangular parallelepiped shape may be less than 1 cm.

(Embodiment Regarding Width Dimensional Relation between Electrode Narrowed Portions)

Figure 15:
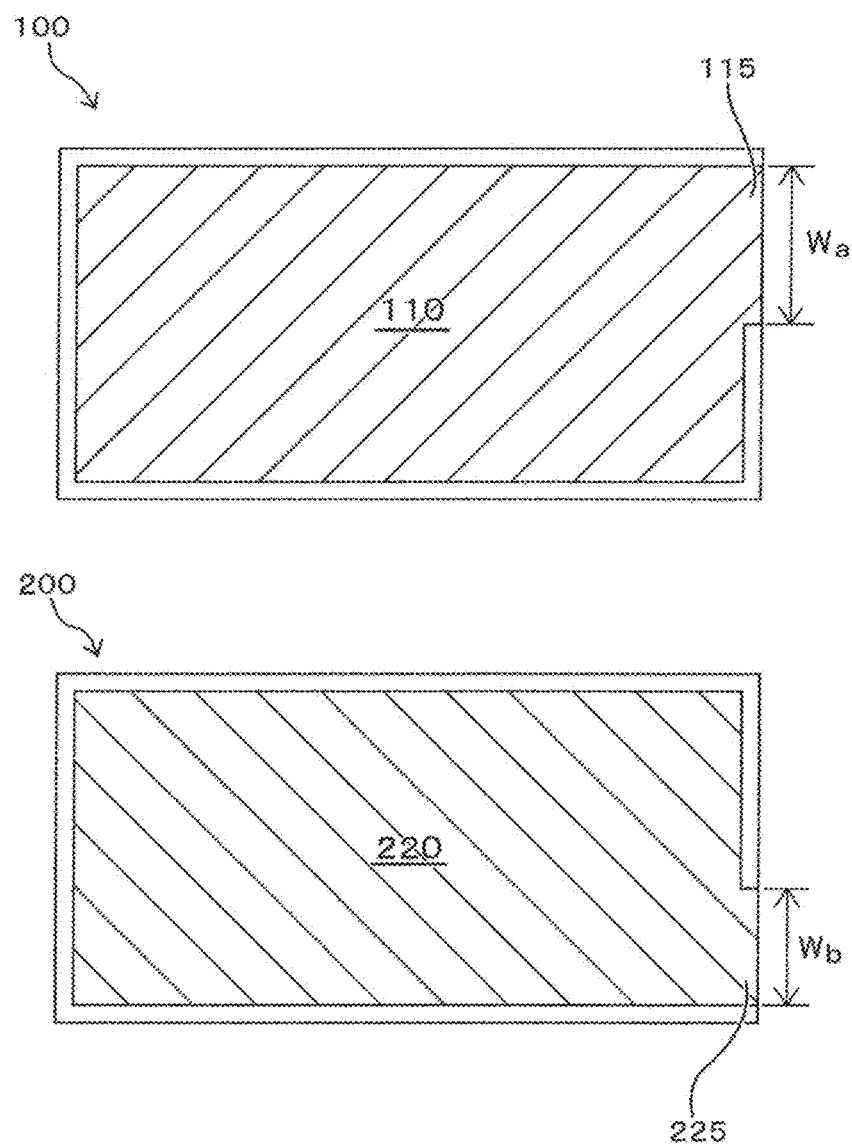
FIG. 15 is a schematic plan view for describing "Embodiment Regarding Width Dimensional Relation between Electrode Narrowed Portions".

This embodiment has a feature in a width dimensional relation between the electrode narrowed portions. In particular, this embodiment has a feature in a relative width dimensional relation between the positive electrode narrowed portion and the negative electrode narrowed portion. Specifically, as illustrated in FIG. 15, the width dimension of the positive electrode narrowed portion 115 is larger than the width dimension of the negative electrode narrowed portion 225. That is, in plan view of the battery illustrated in the drawing, when the width dimension of the positive electrode narrowed portion 115 is designated as "Wa" and the width dimension of the negative electrode narrowed portion 225 is designated as "Wb", Wa>Wb is satisfied.

Such an embodiment of the width dimensional relation between the electrode narrowed portions may be more suitable in terms of the electron conductivity of the electrodes. Specifically, the electron conductivity is lower in the positive electrode layer than in the negative electrode layer in terms of material quality; however, in this case, when the width dimension of the positive electrode narrowed portion is larger than the width dimension of the negative electrode narrowed portion, the electron conductivity of the positive electrode layer is easily improved.

[Method for Manufacturing Solid-State Battery]

The solid-state battery of the present invention can be obtained through a process of producing a solid-state battery laminate having a positive electrode layer, a negative electrode layer, and a solid electrolyte layer between these electrodes.

The solid-state battery laminate can be produced using a printing method such as a screen printing method, a green sheet method using a green sheet, or a composite method thereof. That is, the solid-state battery laminate can be produced according to a common method for manufacturing a solid-state battery. Therefore, as raw materials such as a solid electrolyte, an organic binder, a solvent, an arbitrary additive, a positive electrode active material, and a negative electrode active material which will be described below, those used in a known method for manufacturing a solid-state battery may be adopted.

Hereinafter, for better understanding the present invention, a certain one manufacturing method will be exemplified and described, but the present invention is not limited to this method. Temporal matters such as description order in the following description are merely for explanatory convenience, and are not necessarily limited thereto.

(Laminate Block Formation)

A solid electrolyte, an organic binder, a solvent, and an arbitrary additive are mixed to prepare a slurry. Next, a sheet having a thickness, for example, about 5 μm to 50 μm after firing is obtained from the prepared slurry by sheet molding. This sheet finally forms the solid electrolyte layer in the solid-state battery laminate.

A positive electrode active material, a solid electrolyte, a conduction aid, an organic binder, a solvent, and an arbitrary additive are mixed to produce a positive electrode paste. Similarly, a negative electrode active material, a solid electrolyte, a conduction aid, an organic binder, a solvent, and an arbitrary additive are mixed to produce a negative electrode paste. As the organic binder, the solvent, the additive, and the like used here, those commonly used in the manufacturing of the solid-state battery may be used.

The positive electrode paste is applied to the sheet, and as necessary, a current collecting layer is printed. A precursor of the positive electrode active material region obtained from the positive electrode paste is preferably formed by printing so that the precursor has a narrowed shape. It is preferable to obtain a precursor of the "margin portion" around the positive electrode layer by applying an insulating paste. Such an embodiment refers to, for example, the lower view of FIG. 14.

Similarly, the negative electrode paste is applied to the sheet, and as necessary, a current collecting layer is printed. A precursor of the negative electrode active material region obtained from the negative electrode paste is preferably formed by printing so that the precursor has a narrowed shape. It is preferable to obtain a precursor of the "margin portion" around the negative electrode layer by applying an insulating paste. Such an embodiment refers to, for example, the lower view of FIG. 14.

The sheet to which the positive electrode paste is applied (that is, the precursor of the positive electrode layer) and the sheet to which the negative electrode paste is applied (that is, the precursor of the negative electrode layer) are alternately laminated to obtain a laminate. Note that, the outermost layer of the laminate (the uppermost layer and/or the lowermost layer) may be the solid electrolyte layer or an insulating layer, or may be an electrode layer.

In the precursor of the positive electrode layer, it is precursor to form a contour portion in which the positive electrode paste is provided to extend to the plan-view contour and a contour portion in which the positive electrode paste is not provided to extend to the plan-view contour. For example, the positive electrode precursor can be formed in this way using a printing method. The contour portion in which the positive electrode paste is provided to extend to the plan-view contour finally becomes the "active material contour portion in which an electrode active material is provided to extend to a plan-view contour" in the solid-state battery laminate, and the contour portion in which the positive electrode paste is not provided to extend to the plan-view contour finally becomes the "non-active material contour portion in which an electrode active material is not provided to extend to the plan-view contour" in the solid-state battery laminate. Similarly, also in the precursor of the negative electrode layer, it is precursor to form a contour portion in which the negative electrode paste is provided to extend to the plan-view contour and a contour portion in which the negative electrode paste is not provided to extend to the plan-view contour. For example, the negative electrode precursor can be formed in this way using a printing method. The contour portion in which the negative electrode paste is provided to extend to the plan-view contour finally becomes the "active material contour portion in which an electrode active material is provided to extend to a plan-view contour" in the solid-state battery laminate, and the contour portion in which the negative electrode paste is not provided to extend to the plan-view contour finally becomes the "non-active material contour portion in which an electrode active material is not provided to extend to the plan-view contour" in the solid-state battery laminate. Although a plurality of precursors of the positive electrode layer may be used, the plurality of precursors of the positive electrode layer are preferably formed such that both the active material contour portion and the non-active material contour portion are positioned at the same place of the plan-view contour. Similarly, although a plurality of precursors of the negative electrode layer may be used, the plurality of precursors of the negative electrode layer are preferably formed such that both the active material contour portion and the non-active material contour portion are positioned at the same place of the plan-view contour. That is, when the solid-state battery laminate is finally obtained by laminating these layers, it is preferable to form the respective precursors of the positive electrode layer and the negative electrode layer so as to have such a positional relationship that the active material contour portion of the plurality of positive electrode layers and the negative electrode layer of the plurality of negative electrode layers do not face each other in a lamination direction. This means that it is preferable to form the respective precursors of the positive electrode layer and the negative electrode layer so as to have such a positional relationship that the active material contour portion of the positive electrode layer and the non-active material contour portion of the negative electrode layer face each other in the lamination direction and/or to have such a positional relationship that the non-active material contour portion of the positive electrode layer and the active material contour portion of the negative electrode layer face each other in the lamination direction when the solid-state battery laminate is formed.

(Battery Sintered Body Formation)

After the obtained laminate is integrally pressure-bonded, the laminate is subjected to degreasing and firing. Thereby, the sintered solid-state battery laminate is obtained. Note that, as necessary, the sintered solid-state battery laminate may be subjected to a cutting treatment (such a cutting treatment may be performed before degreasing and/or firing, or may be performed after degreasing and/or firing).

(Formation of External Terminal)

The external terminal on the positive electrode side can be formed, for example, by applying a conductive paste to the positive electrode exposed side surface (particularly, the "active material contour portion" on the positive electrode side) of the sintered laminate. Similarly, the external terminal on the negative electrode side may be formed, for example, by applying a conductive paste to the negative electrode exposed side surface (particularly, the "active material contour portion" on the negative electrode side) of the sintered laminate. Such an application itself may use a common technique. Alternatively, the external terminal may be provided by disposing a predetermined metal member to be pasted. The main material for such an external terminal may be at least one selected from the group consisting of silver, gold, platinum, aluminum, copper, tin, and nickel.

The external terminals on the positive electrode side and the negative electrode side are not limited to be formed after firing the laminate, and may be formed before firing and subjected to simultaneous sintering.

Through the steps as described above, a desired solid-state battery laminate can be finally obtained. The solid-state battery of the present invention may be a solid-state battery laminate itself, but can be obtained by an additional treatment such as forming an additional protective film or the like on the surface of the solid-state battery laminate or enclosing the solid-state battery laminate in an appropriate exterior body as necessary. Such an additional protective film or additional treatment itself may be common.

It should be noted that such a manufacturing method of the present invention includes the following aspects.

First aspect: A method for manufacturing a solid-state battery, the method including: forming a solid-state battery laminate including a positive electrode layer having a positive electrode active material, a negative electrode layer having a negative electrode active material, and a solid electrolyte layer interposed between the positive electrode layer and the negative electrode layer, in which in the solid-state battery laminate, an active material contour portion in which an electrode active material is provided to extend to a plan-view contour of the solid-state battery laminate in one of the positive electrode layer and the negative electrode layer and a non-active material contour portion in which an electrode active material is not provided to extend to the plan-view contour in the other of the positive electrode layer and the negative electrode layer face each other in a lamination direction, and one of a positive electrode external terminal and a negative electrode external terminal is selectively arranged to be positioned with respect to a place of the plan-view contour where the positive electrode external terminal and the negative electrode external terminal face each other.

Second aspect: A second active material contour portion in which an electrode active material is provided to extend to a plan-view contour of the solid-state battery laminate in the other of the positive electrode layer and the negative electrode layer and a second non-active material contour portion in which an electrode active material is not provided to extend to the plan-view contour in the one of the positive electrode layer and the negative electrode layer face each other in the lamination direction, and the other of the positive electrode external terminal and the negative electrode external terminal is selectively arranged to be positioned with respect to the place where the positive electrode external terminal and the negative electrode external terminal face each other.

Due to such aspects, in the manufacturing method of the present invention, there are relatively few restrictions in terms of arrangement of the external terminals of the positive electrode and the negative electrode, and these external terminals can be relatively freely arranged.

Although the embodiments of the present invention have been hereinbefore described, they are merely the typical embodiments. It will be readily appreciated by those skilled in the art that the present invention is not limited to the above embodiments, and that various modifications are possible without departing from the scope of the present invention.

Figure 16:
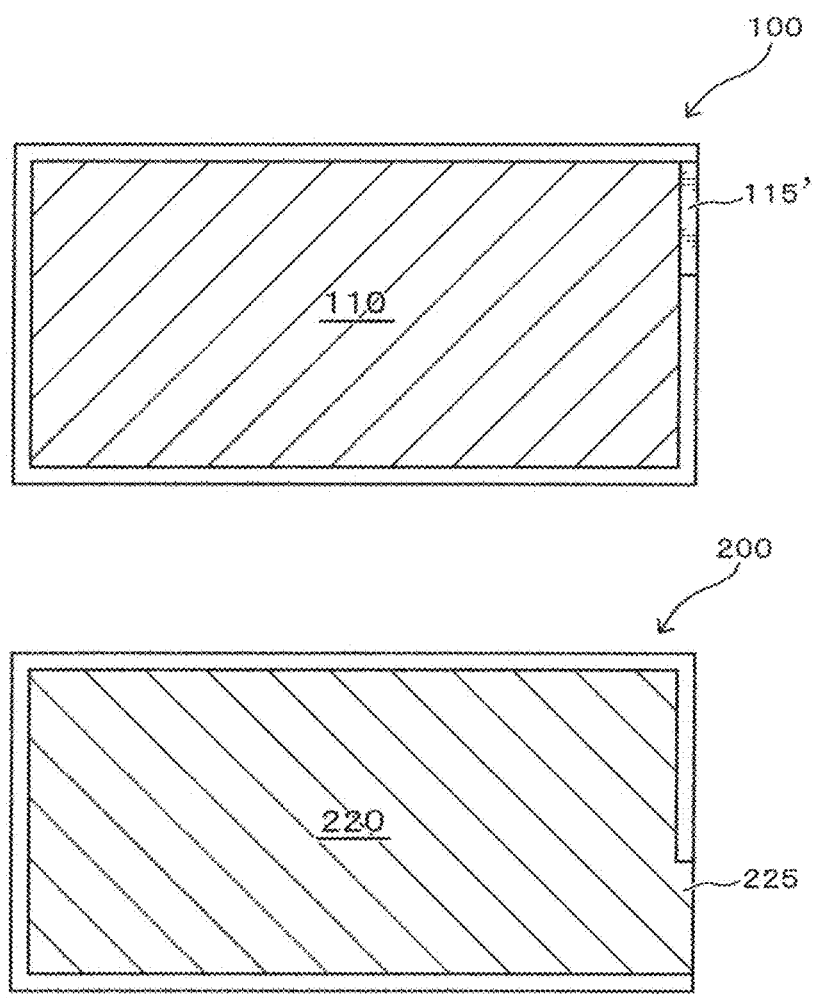
FIG. 16 is a schematic plan view for describing a preferred feature with a narrowed portion when a current collecting layer is provided with respect to an electrode layer.

For example, in the drawings referred to in the above description, the embodiment in which the current collecting layer is included in the electrode layer is illustrated, but the present invention is not limited thereto. The current collecting layer may be additionally provided as a layer that contributes to collecting and supplying electrons generated in the active material due to the battery reaction. That is, the positive electrode current collecting layer may be provided with respect to the positive electrode layer, and/or the negative electrode current collecting layer may be provided with respect to the negative electrode layer. For example, while the current collecting layer is not provided on the negative electrode layer, the current collecting layer (that is, the positive electrode current collecting layer) may be provided only on the positive electrode layer. When the current collecting layer is provided as described above, the current collecting layer may form a narrowed portion. For example, when the positive electrode current collecting layer is provided on the positive electrode layer, as illustrated in FIG. 16, the positive electrode narrowed portion may be formed by adopting an embodiment in plan view in which a portion 115' of the positive electrode current collecting layer protrudes to the plan-view contour of the solid-state battery laminate.

Figure 17:
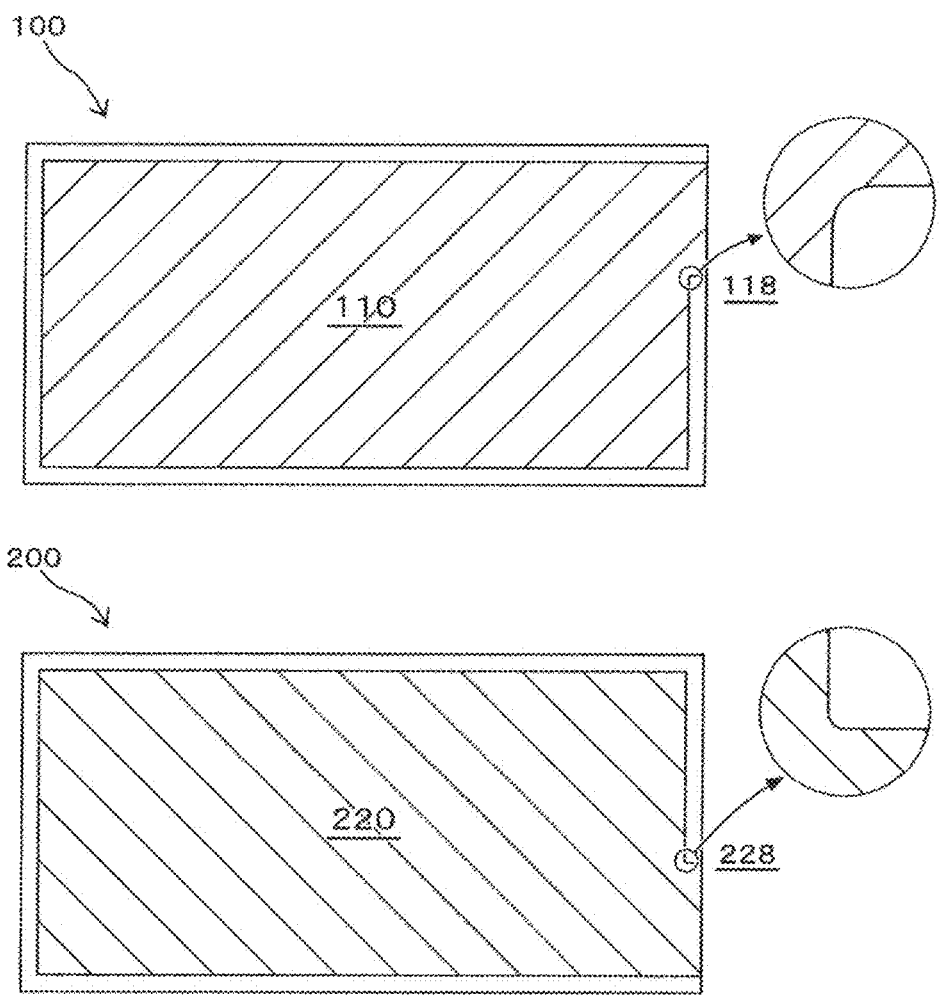
FIG. 17 is a schematic plan view for describing a preferred feature with a contour corner of a narrowed portion.

For example, in the drawings referred to in the above description, the electrode narrowed portion has an angular contour, but the present invention is not limited thereto. That is, the contour of the narrowed portion is not limited to a linear shape, and may has a curved shape or may sectionally include such a curved portion. As illustrated in FIG. 17, in plan view, the contour corner of the narrowed portion (118, 228) is rounded or may be rounded. In such a case, it is possible to achieve an effect of enabling undesired stress concentration at the contour corner to be reduced.

The solid-state battery according to the present invention can be used in various fields where battery use or power storage is assumed. Although being merely an example, the solid-state battery of the present invention can be used in the electronics packaging field. The solid-state battery of the present invention can also be used in electric, information, and communication fields using mobile devices and the like (for example, electric and electronic device fields or mobile device fields including mobile phones, smartphones, notebook computers and digital cameras, activity meters, arm computers, electronic paper, wearable devices, and the like, and small-sized electronic devices such as RFID tags, card-type electronic money, and smartwatches), home and small industrial applications (for example, fields of electric tools, golf carts, and home, nursing, and industrial robots), large industrial applications (for example, fields of forklifts, elevators, and harbor cranes), transportation system fields (for example, fields of hybrid vehicles, electric vehicles, buses, trains, power-assisted bicycles, electric two-wheeled vehicles, and the like), power system applications (for example, fields of various types of power generation, road conditioners, smart grids, household power storage systems, and the like), medical applications (fields of medical device such as earphone hearing aids), pharmaceutical applications (fields of dosage management systems and the like), IoT fields, space and deep sea applications (for example, fields of spacecrafts, submersible research vehicles, and the like), and the like.

DESCRIPTION OF REFERENCE SYMBOLS

100: Positive electrode layer
110: Positive electrode active material region
115: Positive electrode narrowed portion
118: Contour corner of narrowed portion
140: Active material contour portion (second active material contour portion)
160: Non-active material contour portion
170: Non-active material region (positive electrode side)
200: Negative electrode layer
220: Negative electrode active material region
225: Negative electrode narrowed portion
228: Contour corner of narrowed portion
240: Active material contour portion
240I: Active material contour portion
240II: Active material contour portion
240III: Active material contour portion
240IV: Active material contour portion
260: Non-active material contour portion (second non-active material contour portion)
270: Non-active material region (negative electrode side)
300: Solid electrolyte layer
400: External terminal
400A: Positive electrode external terminal
400A': Positive electrode extending portion
400B: Negative electrode external terminal
400B': Negative electrode extending portion
500: Solid-state battery laminate
510: Same side surface
550I to IV: Plan-view contour of solid-state battery laminate
600: Substrate

The invention claimed is:

1. A solid-state battery, comprising:
a solid-state battery laminate including a positive electrode layer, a negative electrode layer, and a solid electrolyte layer interposed between the positive electrode layer and the negative electrode layer, each of the positive electrode layer and the negative electrode layer having an electrode active material,
wherein a first active material contour portion in which the electrode active material in one of the positive electrode layer and the negative electrode layer extends to a first plan-view contour of the solid-state battery laminate and a first non-active material contour portion in which the electrode active material in the other of the positive electrode layer and the negative electrode layer does not extend to the first plan-view contour face each other in a lamination direction, wherein the first active material contour portion is on at least two sides of the solid-state battery laminate forming the first plan-view contour, and the first non-active material contour region is on the at least two sides of the solid-state battery laminate forming the first plan-view contour.

2. The solid-state battery according to claim 1, wherein a second active material contour portion in which the electrode active material in the other of the positive electrode layer and the negative electrode layer extends to a second plan-view contour of the solid-state battery laminate and a second non-active material contour portion in which the electrode active material in the one of the positive electrode layer and the negative electrode layer does not extend to the second plan-view contour face each other in the lamination direction, and
a first surface of the solid-state battery laminate on which the first active material contour portion and the first non-active material contour portion face each other and a second surface of the solid-state battery laminate on which the second active material contour portion and the second non-active material contour portion face each other are different from each other.

3. The solid-state battery according to claim 2, further comprising:
a positive electrode external terminal; and
a negative electrode external terminal,
wherein one of the positive electrode external terminal and the negative electrode external terminal is in contact with the first active material contour portion, and
the other of the positive electrode external terminal and the negative electrode external terminal is in contact with the second active material contour portion.

4. The solid-state battery according to claim 3, wherein the one of the positive electrode external terminal and the negative electrode external terminal and the other of the positive electrode external terminal and the negative electrode external terminal are on side surfaces of the solid-state battery laminate which do not face each other.

5. The solid-state battery according to claim 3, wherein both of the positive electrode external terminal and the negative electrode external terminal are on a same surface of the solid-state battery laminate.

6. The solid-state battery according to claim 1, wherein the first active material contour portion is on at least one side of the solid-state battery laminate forming the first plan-view contour, and
the first non-active material contour region is on the at least one side of the solid-state battery laminate forming the first plan-view contour.

7. The solid-state battery according to claim 1, wherein the first active material contour portion is on all sides forming the first plan-view contour, and
the first non-active material contour portion is on all sides forming the first plan-view contour.

8. The solid-state battery according to claim 1, wherein the one of the positive electrode layer and the negative electrode layer is the negative electrode layer and the active material of the negative electrode layer has a narrowed shape that narrows toward a side forming the first plan-view contour, and
the other of the positive electrode layer and the negative electrode layer is the positive electrode layer and the active material of the positive electrode layer has a narrowed shape that narrows toward a side forming the first plan-view contour.

9. The solid-state battery according to claim 8, wherein the narrowed shape of the active material of the negative electrode is larger than the narrowed shape of the active material of the positive electrode.

10. The solid-state battery according to claim 8, wherein a width dimension of the narrowed shape of the active material of the positive electrode is larger than a width dimension of the narrowed shape of the active material of the negative electrode.

11. The solid-state battery according to claim 1, wherein the first non-active material contour portion contains an insulating material.

12. The solid-state battery according to claim 1, wherein the solid-state battery laminate has a rectangular parallelepiped shape.

13. The solid-state battery according to claim 1, wherein the solid-state battery laminate is a sintered body.

14. The solid-state battery according to claim 1, wherein the positive electrode layer and the negative electrode layer are layers capable of occluding and releasing lithium ions.

* * * * *